US012748968B2

(12) United States Patent
Chen et al.

(10) Patent No.: US 12,748,968 B2
(45) Date of Patent: Sep. 29, 2026

(54) METHOD FOR TRAINING AIRCRAFT CONTROL AGENT

(71) Applicant: The Boeing Company, Chicago, IL (US)

(72) Inventors: Yang Chen, Malibu, CA (US); Fan Hung, Malibu, CA (US); Deepak Khosla, Malibu, CA (US); Sean Soleyman, Malibu, CA (US); Joshua G. Fadaie, Malibu, CA (US)

(73) Assignee: The Boeing Company, Arlington, VA (US)

( * ) Notice: Subject to any disclaimer, the term of this patent is extended or adjusted under 35 U.S.C. 154(b) by 749 days.

(21) Appl. No.: 18/049,479

(22) Filed: Oct. 25, 2022

(65) Prior Publication Data

US 2024/0135167 A1 Apr. 25, 2024
US 2024/0232611 A9 Jul. 11, 2024

(51) Int. Cl.
*G06F 16/00* (2019.01)
*G06N 3/08* (2023.01)

(52) U.S. Cl.
CPC .................................... *G06N 3/08* (2013.01)

(58) Field of Classification Search
CPC .......... G06N 3/08; G06N 3/004; G06N 3/092; G06N 20/00; G06N 3/04; G05D 1/619; G05D 1/689; G05D 2101/15; G05D 2105/35; G05D 2107/34; G05D 2109/20
See application file for complete search history.

(56) References Cited

U.S. PATENT DOCUMENTS

| | | | | |
|---|---|---|---|---|
| 9,019,128 | B1 * | 4/2015 | Kim | G01C 23/00 701/14 |
| 11,527,165 | B2 * | 12/2022 | Sprengart | G08G 5/53 |
| 12,067,068 | B1 * | 8/2024 | Margolin | G06F 16/954 |
| 12,282,337 | B2 * | 4/2025 | Kumar | G05D 1/46 |

(Continued)

FOREIGN PATENT DOCUMENTS

| | | |
|---|---|---|
| WO | 2024110482 A1 | 5/2024 |
| WO | 2024149747 A1 | 7/2024 |

OTHER PUBLICATIONS

Clarke et al. Closed-Loop Q-learning Control of a Small Unmanned Aircraft, 14 pages (Year: 2020).*

(Continued)

*Primary Examiner* — Noosha Arjomandi
(74) *Attorney, Agent, or Firm* — Harrity & Harrity, LLP

(57) ABSTRACT

An example includes a method for training an agent to control an aircraft. The method includes: selecting, by the agent, first actions for the aircraft to perform within a first environment respectively during first time intervals based on first states of the first environment during the first time intervals, updating the agent based on first rewards that correspond respectively to the first states, selecting, by the agent, second actions for the aircraft to perform within a second environment respectively during second time intervals based on second states of the second environment during the second time intervals, and updating the agent based on second rewards that correspond respectively to the second states. At least one first rule of the first environment is different from at least one rule of the second environment.

20 Claims, 17 Drawing Sheets

(56) References Cited

U.S. PATENT DOCUMENTS

| | | | | |
|---|---|---|---|---|
| 2016/0163217 | A1* | 6/2016 | Harkness | G09B 7/00 434/65 |
| 2016/0304222 | A1 | 10/2016 | Fernandez et al. | |
| 2017/0024643 | A1 | 1/2017 | Lillicrap et al. | |
| 2018/0089563 | A1* | 3/2018 | Redding | G06N 3/0464 |
| 2019/0130312 | A1 | 5/2019 | Xiong et al. | |
| 2019/0259051 | A1 | 8/2019 | Silver et al. | |
| 2019/0357520 | A1 | 11/2019 | Redden et al. | |
| 2020/0379486 | A1 | 12/2020 | Khosla et al. | |
| 2021/0004647 | A1* | 1/2021 | Amirloo Abolfathi | G06N 3/094 |
| 2021/0125076 | A1 | 4/2021 | Zhang et al. | |
| 2021/0325891 | A1* | 10/2021 | Young | G06N 3/09 |
| 2021/0397179 | A1 | 12/2021 | Fadaie et al. | |
| 2022/0164636 | A1 | 5/2022 | Fadaie et al. | |
| 2022/0198255 | A1* | 6/2022 | Sautier | G06F 40/205 |
| 2022/0308598 | A1 | 9/2022 | Nakazawa et al. | |
| 2022/0404831 | A1* | 12/2022 | Soleyman | G06N 3/006 |
| 2024/0046070 | A1 | 2/2024 | Zaheer et al. | |
| 2024/0078915 | A1* | 3/2024 | Roper, Jr. | G08G 5/56 |
| 2024/0135167 | A1* | 4/2024 | Chen | G06N 3/08 |
| 2024/0220795 | A1 | 7/2024 | Zhang et al. | |

OTHER PUBLICATIONS

Li et al., "Autonomous air combat decision-making of UAV based on parallel self-play reinforcement learning", CAAI Transactions on Intelligence Technology, vol. 8, No. 1, Jun. 13, 2022, pp. 64-81.

Extended European Search Report prepared by the European Patent Office in application No. EP 23 19 6876.9 dated Feb. 29, 2024.

McGrew, J. Real-time maneuvering decisions for autonomous air combat. Diss. Massachusetts Institute of Technology, 2008.

Haarnoja, T., Zhou, A., Hartikainen, K., Tucker, G., Ha, S., Tan, J., Kumar, V., Zhu, H., Gupta, A., Abbeel, P., Levine, S. "Soft actor-critic algorithms and applications." arXiv preprint arXiv:1812.05905 (2018).

De Lima Filho, G.M., et al., "Optimization of Unmanned Air Vehicle Tactical Formation in War Games," IEEE Access , Vo. 10, 2022, pp. 21727-21741.

Kurniawan, B., et al., "An Empirical Study of Reward Structures for Actor-Critic Reinforcement Learning in Air Combat Manoeuvring Simulation," Springer Nature Swistzerland, 2019, pp. 54-65.

Liu, D., et al., "Game of Drones: Intelligent Online Decision Making of Multi-UAV Confrontation," IEEE Transactions on Emerging Topics in Computational Intelligence, vol. 28 (2), Apr. 2024, pp. 2086-2100.

"AlphaStar: Mastering the real-time strategy game Star Craft II," AlphaStar, Alphabet Inc., Jan. 24, 2019, accessed May 23, 2023, 17 pages.https://www.deepmind.com/blog/alphastar-mastering-the-real-time-strategy-game-starcraft-ii.

Baker et al., "Emergent tool use from multi-agent interaction," OpenAI, Sep. 17, 2019, accessed May 23, 2023, 28 pages.http://openai.com/research/emergent-tool-use.

Brockman et al., "OpenAI Five," OpenAI, Jun. 25, 2018, accessed May 23, 2023, 12 pages.https://openai.com/research/openai-five.

European Patent Office Communication, dated Dec. 19, 2024, regarding Application No. EP23196876.9, 3 pages.

Fadaie et al., "Machine Learning Model Based Vehicle Control System," U.S. Appl. No. 18/322,514, filed May 23, 2023, 75 pages.

Foerster, J.N., et al., "Counterfactual Multi-Agent Policy Gradients," Dec. 11, 2024, 11 pages.https://arxiv.org/pdf/1705.08926.pdf.

Jaderberg, M., et al., "Human-level performance in 3D multiplayer games with population-based reiforcement learning," Science, vol. 364, Issue 6443, May 31, 2019, 7 pages.https://www.science.org/doi/10.1126/science.aau6249.

Kipf, T.N., et al., "Semi-supervised Classification with Graph Convolutional Networks," Published as a conference paper at ICLR 2017, Feb. 22, 2017, 14 pages.https://arxiv.org/pdf/1609.02907.

Kong, Y., et al., "Human Action Recognition and Prediction: A Survey," International Journal of Computer Vision, vol. 130, Issue 5, May 1, 2022, 37 pages. https://arxiv.org/pdf/1806.11230.

Lowe, R., et al., "Multi-Agent Action-Critic for Mixed Cooperative-Competitive Environments," Mar. 14, 2020, 12 pages. https://arxiv.org/pdf/1706.02275.pdf.

NG, A.Y., et al., "Algorithms for Inverse Reinforcement Learning," The Seventeeth International Conference on Machine Learning (ICML) '00,) June. 2000, 8 pages.

Office Action, dated Nov. 3, 2025, regarding U.S. Appl. No. 18/734,767, 7 pages.

Ravi, N., et al., "Activity Recognition from Accelerometer Data," The Twentieth National Conference on Artificial Intelligence and the Seventeeth Innovative Applications of Artificial Intelligence Conference, Jul. 9-13, 2005, Pittsburgh, Pennsylvania, 6 pages.

Such, F.P., et al., "Deep Neuroevolution: Genetic Algorithms are a Competitive Alternative for Training Deep Neural Networks for Reinforcement Learning," Apr. 20, 2018, 16 pages.https://arxiv.org/pdf/1712.06567.pdf.

Wang et al., "Heterogeneous Graph Attention Network," Jan. 20, 2021, 11 pages.https://arxiy.org/pdf/1903.07293.pdf.

* cited by examiner

DETERMINING THE FIRST REWARDS BASED ON WHETHER THE ALTITUDE OF THE AIRCRAFT IS LESS THAN OR EQUAL TO THE THRESHOLD ALTITUDE DURING EACH OF THE FIRST TIME INTERVALS OR WHETHER A TRAINING SESSION WITHIN THE FIRST ENVIRONMENT HAS EXPIRED

210

FIG. 11

250

DETERMINING THE FIRST REWARDS BASED ON A DEGREE TO WHICH, DURING EACH OF THE FIRST TIME INTERVALS, A POSITION, AN ORIENTATION, A VELOCITY, OR THE ALTITUDE OF THE FIRST AIRCRAFT IMPROVED WITH RESPECT TO THE FIRST AIRCRAFT FOLLOWING A SECOND AIRCRAFT WITHIN THE FIRST ENVIRONMENT

212

FIG. 12

255

DETERMINING THE SECOND REWARDS BASED ON WHETHER THE ALTITUDE OF THE FIRST AIRCRAFT IS LESS THAN OR EQUAL TO THE THRESHOLD ALTITUDE DURING EACH OF THE SECOND TIME INTERVALS OR WHETHER A TRAINING SESSION WITHIN THE SECOND ENVIRONMENT HAS EXPIRED

214

FIG. 13

260

DETERMINING THE SECOND REWARDS BASED ON A DEGREE TO WHICH, DURING EACH OF THE SECOND TIME INTERVALS, A POSITION, AN ORIENTATION, A VELOCITY, OR THE ALTITUDE OF THE FIRST AIRCRAFT IMPROVED WITH RESPECT TO THE FIRST AIRCRAFT FOLLOWING THE SECOND AIRCRAFT WITHIN THE SECOND ENVIRONMENT

216

FIG. 14

265

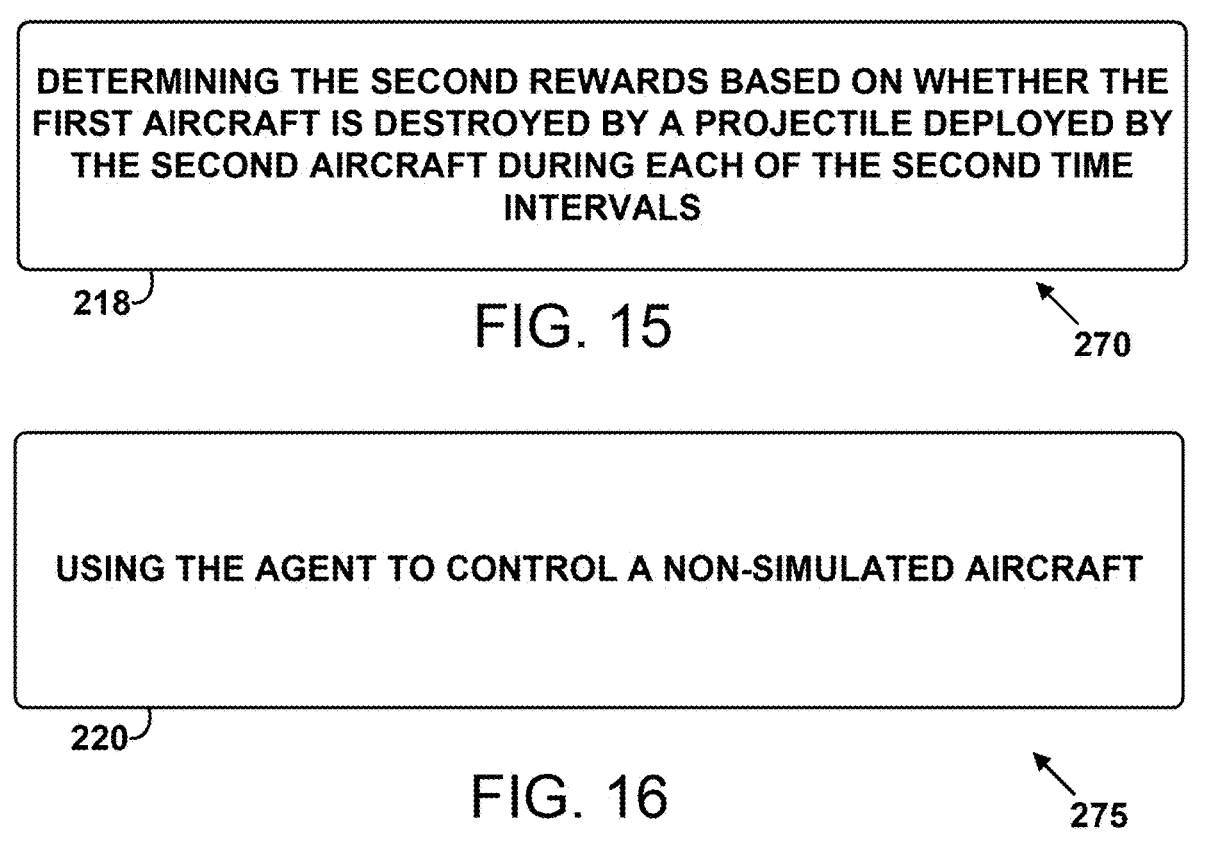

DETERMINING THE SECOND REWARDS BASED ON WHETHER THE FIRST AIRCRAFT IS DESTROYED BY A PROJECTILE DEPLOYED BY THE SECOND AIRCRAFT DURING EACH OF THE SECOND TIME INTERVALS

218

FIG. 15

270

USING THE AGENT TO CONTROL A NON-SIMULATED AIRCRAFT

220

FIG. 16

275

Soft Actor-Critic: Neural Network architecture and hyper-parameters

- Two layers of linear-perceptron with 256 nodes each
- ReLU activation for policy and Q networks
- SGD Adam optimizer, learning rate: 0.001
- Replay buffer size: 1E6
- Mini-batch size: 100
- Update model every: 50 steps
- Episode length: 1000
- Training steps per epoch: 4000

FIG. 17

*Left: neural network parameter values' path through one curriculum stage; right: example 2-stage training curriculum broken down by stages.*

*Example results of Basic Flight training*

| Experiments | Rewards | % Draw |
|---|---|---|
| 1a | Dense + Terminal | 94.60 |
| 1b | Dense_McGrew + Terminal | 90.80 |

FIG. 19

*Example agent performance for different round of Random training as measured by the test scores (agent winning rate) during training.*

| Experiments | Low Altitude Penalty | Round1, 300 epochs | Round2, 300 epochs | Round3, 300 epochs |
|---|---|---|---|---|
| 2a | n/a | 0.60 | 0.61 | 0.65 |
| 2b | 100 | 0.54 | 0.51 | 0.56 |

FIG. 20

*Curriculum Training Results, continuing from Random Combat to Fair Combat as measured in maximum win rate (among 5 differently seeded runs) of the trained agent. See text for details.*

| Evaluation Methods/Conditions | Evaluation after training in Random Combat | Evaluation after continued training in Fair Combat |
|---|---|---|
| Scores in training | 0.56 | 0.92 |
| Random Placement (Random Combat) | 0.53 | 0.55 |
| Offensive Placement (Simple Combat) | 0.60 | 0.66 |
| Neutral Placement (Fair Combat) | 0.49 | 0.90 |

FIG. 21

METHOD FOR TRAINING AIRCRAFT CONTROL AGENT

FIELD

The present disclosure generally relates to training an agent to control an aircraft, and more specifically to training an agent to control an aircraft using at least two training environments defined by different rules.

BACKGROUND

Some aircraft, such as unmanned aerial vehicles (UAVs) are controlled via an automated algorithm instead of manually by a pilot or a remote operator. Many of these automated algorithms for controlling aircraft include deterministic rules that define particular actions the aircraft should take in response to observing various states of the environment of the aircraft. For example, a first rule of an algorithm might state that the aircraft should engage in a banking turn away from an incoming projectile launched by a hostile aircraft. A second rule might state that the aircraft should accelerate to close the distance between itself and a fleeing hostile aircraft to get into position to launch a projectile at the hostile aircraft. Any such fully deterministic algorithm is predictable and thus exploitable to some degree. As such, a need exists for more robust aircraft control methods that are less predictable, less exploitable, and more successful at achieving mission objectives.

SUMMARY

One aspect of the disclosure is a method for training an agent to control an aircraft, the method comprising: selecting, by the agent, first actions for the aircraft to perform within a first environment respectively during first time intervals based on first states of the first environment during the first time intervals; updating the agent based on first rewards that correspond respectively to the first states, wherein the first rewards are based on first rules of the first environment; selecting, by the agent, second actions for the aircraft to perform within a second environment respectively during second time intervals based on second states of the second environment during the second time intervals; and updating the agent based on second rewards that correspond respectively to the second states, wherein the second rewards are based on second rules of the second environment, and wherein at least one first rule of the first rules is different from at least one rule of the second rules.

Another aspect of the disclosure is a non-transitory computer readable medium storing instructions that, when executed by a computing device, cause the computing device to perform functions for training an agent to control an aircraft, the functions comprising: selecting, by the agent, first actions for the aircraft to perform within a first environment respectively during first time intervals based on first states of the first environment during the first time intervals; updating the agent based on first rewards that correspond respectively to the first states, wherein the first rewards are based on first rules of the first environment; selecting, by the agent, second actions for the aircraft to perform within a second environment respectively during second time intervals based on second states of the second environment during the second time intervals; and updating the agent based on second rewards that correspond respectively to the second states, wherein the second rewards are based on second rules of the second environment, and wherein at least one first rule of the first rules is different from at least one rule of the second rules.

Another aspect of the disclosure is a computing device comprising: one or more processors; a computer readable medium storing instructions that, when executed by the one or more processors, cause the computing device to perform functions for training an agent to control an aircraft, the functions comprising: selecting, by the agent, first actions for the aircraft to perform within a first environment respectively during first time intervals based on first states of the first environment during the first time intervals; updating the agent based on first rewards that correspond respectively to the first states, wherein the first rewards are based on first rules of the first environment; selecting, by the agent, second actions for the aircraft to perform within a second environment respectively during second time intervals based on second states of the second environment during the second time intervals; and updating the agent based on second rewards that correspond respectively to the second states, wherein the second rewards are based on second rules of the second environment, and wherein at least one first rule of the first rules is different from at least one rule of the second rules.

By the term “about” or “substantially” with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The features, functions, and advantages that have been discussed can be achieved independently in various examples or may be combined in yet other examples further details of which can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

FIG. 11 is block diagram of a method, according to an example.

FIG. 12 is block diagram of a method, according to an example.

FIG. 13 is block diagram of a method, according to an example.

FIG. 14 is block diagram of a method, according to an example.

FIG. 15 is block diagram of a method, according to an example.

FIG. 16 is block diagram of a method, according to an example.

FIG. 17 shows information related to a training algorithm, according to an example.

FIG. 19 shows results related to a training algorithm, according to an example.

FIG. 20 shows results related to a training algorithm, according to an example.

FIG. 21 shows results related to a training algorithm, according to an example.

DETAILED DESCRIPTION

Figure 1:
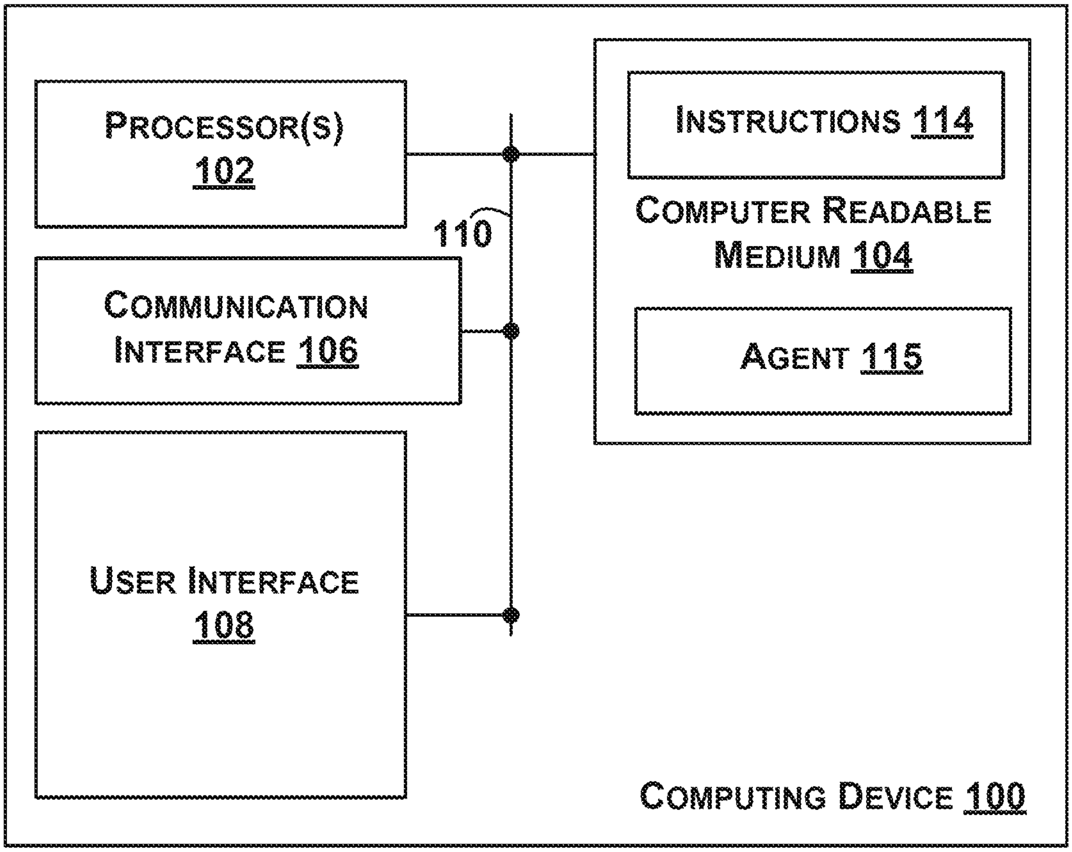
FIG. 1 is a block diagram of a computing device, according to an example.

As noted above, a need exists for more robust aircraft control methods that are less predictable, less exploitable, and more successful at achieving mission objectives. Accordingly, this disclosure includes a method for training an agent to control an aircraft. The agent is generally a machine learning algorithm such as a neural network, but other examples are possible. The method includes selecting, by the agent, first actions for the aircraft to perform within a first environment respectively during first time intervals based on first states of the first environment during the first time intervals. For example, the agent can select as the first actions one or more of an adjustment of a control surface of the aircraft, a thrust adjustment, or a deployment of a projectile. The first environment is generally a virtual environment defined by states (e.g., variables) that change over time such as (1) a position, an orientation, a velocity, or an altitude of the aircraft (or of an additional second aircraft), (2) a number of projectiles remaining for deployment by the first aircraft or the second aircraft, or (3) a position, an orientation, a velocity, or an altitude of a projectile deployed by the first aircraft or the second aircraft. The first environment is also defined by first rules. In some examples, the first environment is used to train the agent on basic flight maneuvers such as flying without crashing and/or pursuing a second aircraft. As such, the only way for the first aircraft to be destroyed within the first environment might be for the first aircraft to crash into the ground or the sea. Prior to training, the agent can be initialized with probabilities for selecting particular actions based on different states of the first environment encountered by the aircraft as time passes within the first environment, and the agent can select the first actions corresponding respectively to the first time intervals accordingly.

The method also includes updating the agent based on first rewards that correspond respectively to the first states. The first rewards are based on the first rules of the first environment. For example, the agent selects one or more actions for performance by the aircraft at a particular time interval of the first environment, which influences the first environment and results in the first environment being defined by a particular set of states at the next time interval. For instance, the aircraft could be at a low altitude and the agent could select a downward pitch maneuver that results in the aircraft crashing, which generally causes the first environment to return a negative reward to the agent. Thus, the agent updates itself so that it is less likely for the agent to select the downward pitch maneuver in response to the aircraft having a low altitude. In a similar manner, the agent could select a starboard yaw maneuver that results in the aircraft more closely following the second aircraft, which generally causes the first environment to return a positive reward. Thus, the agent updates itself so that it is more likely for the agent to select the starboard yaw maneuver in response to encountering that state of the first environment.

The method also includes selecting, by the agent, second actions for the aircraft to perform within a second environment respectively during second time intervals based on second states of the second environment during the second time intervals. Similar to the first environment, the first aircraft could be destroyed within the second environment by crashing. However, the second environment may also allow the first aircraft to be destroyed by being intercepted by a projectile deployed by the second aircraft. Thus, after the agent learns basic flight maneuvers in the first environment, the second environment can be used to train the agent on advanced flight maneuvers such as achieving a position relative to the second aircraft suitable for deploying a projectile and avoiding projectiles deployed by the second aircraft.

The method also includes updating the agent based on second rewards that correspond respectively to the second states. The second rewards are based on second rules of the second environment. At least one first rule of the first environment is different from at least one rule of the second environment. For example, the agent selects one or more actions for performance by the aircraft at a particular time interval of the second environment, which influences the second environment and results in the second environment being defined by a particular set of states at the next time interval. For instance, while being pursued by the second aircraft the agent could select continuing with its present speed and bearing, making it easier for the second aircraft to pursue the first aircraft and deploy a projectile that intercepts and destroys the first aircraft. This generally causes the second environment to return a negative reward to the agent. Thus, the agent updates itself so that it is less likely for the agent to continue its present speed and bearing in response to being pursued by the second aircraft within the second environment. In a similar manner, the agent could select a starboard yaw maneuver that better evades the second aircraft, which generally causes the second environment to return a positive reward. Thus, the agent updates itself so that it is more likely for the agent to select the starboard yaw maneuver in response to being pursued by the second aircraft in the second environment.

Training the agent sequentially using environments and rules with increasing difficulty and/or complexity can allow the agent to progressively and effectively learn basic flight control, and then defensive and offensive maneuvering, and achieve balance between flying defensively to avoid being destroyed by another aircraft and positioning to destroy an opponent.

Disclosed examples will now be described more fully hereinafter with reference to the accompanying Drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

FIG. 1 is a block diagram of a computing device 100. The computing device 100 includes one or more processors 102, a non-transitory computer readable medium 104, a communication interface 106, and a user interface 108. Components of the computing device 100 are linked together by a system bus, network, or other connection mechanism 110.

The one or more processors 102 can be any type of processor(s), such as a microprocessor, a digital signal processor, a multicore processor, etc., coupled to the non-transitory computer readable medium 104.

The non-transitory computer readable medium 104 can be any type of memory, such as volatile memory like random access memory (RAM), dynamic random access memory (DRAM), static random access memory (SRAM), or non-volatile memory like read-only memory (ROM), flash memory, magnetic or optical disks, or compact-disc read-only memory (CD-ROM), among other devices used to store data or programs on a temporary or permanent basis.

Additionally, the non-transitory computer readable medium 104 stores instructions 114. The instructions 114 are executable by the one or more processors 102 to cause the computing device 100 to perform any of the functions or methods described herein. The non-transitory computer readable medium 104 also stores data and instructions constituting the agent 115, which can take the form of a neural network or another type of machine learning algorithm.

The communication interface 106 can include hardware to enable communication within the computing device 100 and/or between the computing device 100 and one or more other devices. The hardware can include transmitters, receivers, and antennas, for example. The communication interface 106 can be configured to facilitate communication with one or more other devices, in accordance with one or more wired or wireless communication protocols. For example, the communication interface 106 can be configured to facilitate wireless data communication for the computing device 100 according to one or more wireless communication standards, such as one or more Institute of Electrical and Electronics Engineers (IEEE) 801.11 standards, ZigBee standards, Bluetooth standards, etc. As another example, the communication interface 106 can be configured to facilitate wired data communication with one or more other devices.

The user interface 108 can include one or more pieces of hardware used to provide data and control signals to the computing device 100. For instance, the user interface 108 can include a mouse or a pointing device, a keyboard or a keypad, a microphone, a touchpad, or a touchscreen, among other possible types of user input devices. Generally, the user interface 108 can enable an operator to interact with a graphical user interface (GUI) provided by the computing device 100 (e.g., displayed by a display of the user interface 108).

The user interface 108 can include a display and/or loudspeakers that provide audio or visual output. The display can be any type of display component configured to display data. As one example, the display can include a touchscreen display. As another example, the display can include a flat-panel display, such as a liquid-crystal display (LCD) or a light-emitting diode (LED) display. Additionally or alternatively, the display includes a virtual reality display, an extended reality display, and/or an augmented reality display.

Figure 2:
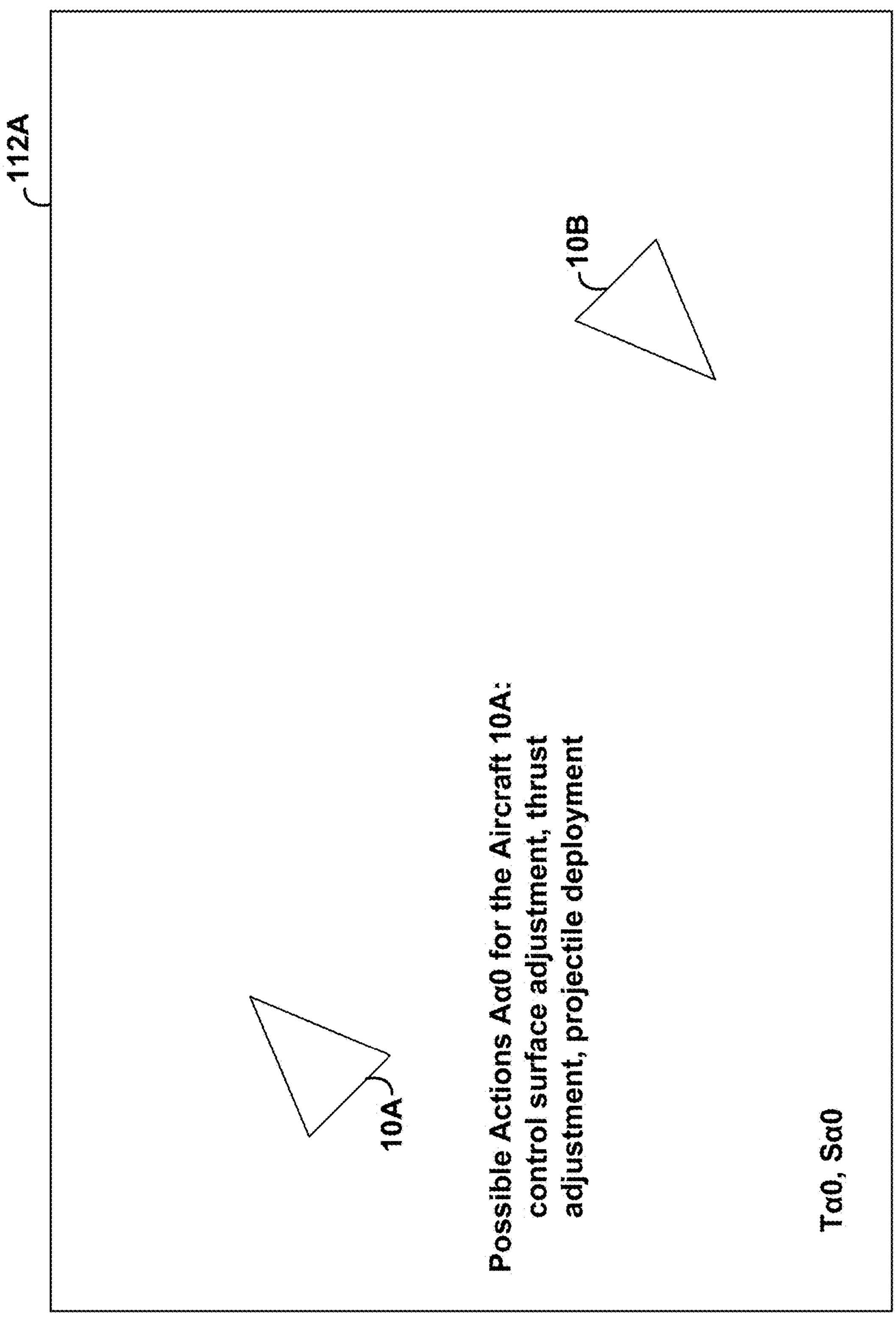
FIG. 2 is a schematic diagram of an environment including two aircraft, according to an example.

FIG. 2 shows an environment 112A that includes an aircraft 10A and an aircraft 10B. As shown, the initial conditions of the environment 112A include the aircraft 10A and an aircraft 10B being positioned such that neither the aircraft 10A nor the aircraft 10B has an offensive advantage compared to the other aircraft. For example, neither aircraft has a forward end more oriented toward an aft end of the other aircraft when compared to the other aircraft. However, other examples are possible. The environment 112A is a virtual (e.g., simulated) environment generated by a computing device 100. In some examples, rules of the environment 112A do not allow the aircraft 10A to be destroyed except for when an altitude of the aircraft 10A becomes less than or equal to a threshold altitude such as zero (e.g., the aircraft 10A crashes into the ground or the sea). The rules of the environment 112A generally provide for a negative reward (e.g., a penalty) to be provided to the agent 115 if the aircraft 10A crashes (e.g., is destroyed). Additionally, the rules of the environment 112A can provide positive rewards for each time interval Tα0, Tα1, Tα2, . . . Tαx the aircraft 10A is above a non-zero altitude such as 1,000 feet and for each time interval Tα0, Tα1, Tα2, . . . Tαx the aircraft 10A is positioned favorably and/or improves its position for deploying a projectile at the aircraft 10B (e.g., behind the aircraft 10B and oriented toward the aircraft 10B). As such, the agent 115 is trained within the environment 112A to control the aircraft 10A to perform safe flight maneuvers that place and maintain the aircraft 10A in a position to deploy one or more projectiles at the aircraft 10B.

States Sα0, Sα1, Sα2, . . . Sαx corresponding respectively to time intervals Tα0, Tα1, Tα2, . . . Tαx of the environment 112A can be modeled using (1) equations related to physical laws of gravity, aerodynamics, or classical mechanics, (2) performance capabilities of the aircraft 10A and/or its projectiles, and (3) performance capabilities of the aircraft 10B and its projectiles. The aircraft 10A and the aircraft 10B can each take the form of a fighter aircraft or a UAV, but other examples are possible. The states Sα0-Sαx define the condition of the environment 112A at the corresponding time intervals Tα0-Tαx and can include (1) a position, an orientation, a velocity, or an altitude of the aircraft 10A and/or of the 10B aircraft, (2) a number of projectiles remaining for deployment by the aircraft 10A and/or the aircraft 10B, and/or (3) a position, an orientation, a velocity, or an altitude of a projectile deployed by the aircraft 10A and/or the 10B aircraft.

In an initial training session involving the environment 112A, the agent 115 is generally initialized with (e.g., arbitrary) probabilities of selecting particular actions for performance by the aircraft 10A in response to encountering or observing various potential states of the environment 112A. A training session within the environment 112A generally lasts for a predetermined number of time intervals or until the aircraft 10A is destroyed by crashing into the ground or sea. Typically, the computing device 100 trains the agent 115 using hundreds or thousands of training sessions within the environment 112A prior to training within the environment 112B described below.

For example, the agent 115 selects actions Aα0, Aα1, Aα2, . . . Aαx for the aircraft 10A to perform within the environment 112A respectively during the time intervals Tα0, Tα1, Tα2, . . . Tαx based on the states Sα0, Sα1, Sα2, . . . Sαx of the environment 112A during the time intervals Tα0, Tα1, Tα2, . . . Tαx.

In FIG. 2, the environment 112A is defined by an initial state Sα0 corresponding to an initial time interval Tα0. As such, the agent 115 operated by the computing device 100 selects one or more actions Aα0 for performance by the aircraft 10A during the time interval Tα0 based on the state Sα0. The actions Aα0 can include one or more of an adjustment of a control surface of the aircraft 10A, a thrust adjustment for the aircraft 10A, or a deployment of a projectile from the aircraft 10A. In some examples, the aircraft 10A will automatically deploy a projectile (e.g., if available) to intercept the aircraft 10B when two conditions are satisfied simultaneously: (1) the aircraft 10A is positioned within a threshold distance of the aircraft 10B and (2) the aircraft 10A is positioned and oriented such that the aircraft 10B is positioned within a predefined bearing range of the aircraft 10A.

For example, the state Sα0 of the environment 112A can be defined as the aircraft 10A having a northeasterly heading (e.g., a bearing of 45°), a level pitch, a velocity of 200 m/s, and an altitude of 10,000 feet, and the aircraft 10B having a southwesterly heading (e.g., a bearing of 225°), a level pitch, a velocity of 200 m/s, and an altitude of 15,000 feet. As an example, the agent 115 uses initialized probabilities to stochastically select the actions Aα0 in the form of a starboard yaw action, an upward pitch action, and a thrust decrease action for the aircraft 10A to perform during the time interval Tα0 based on the state Sα0.

Figure 3:
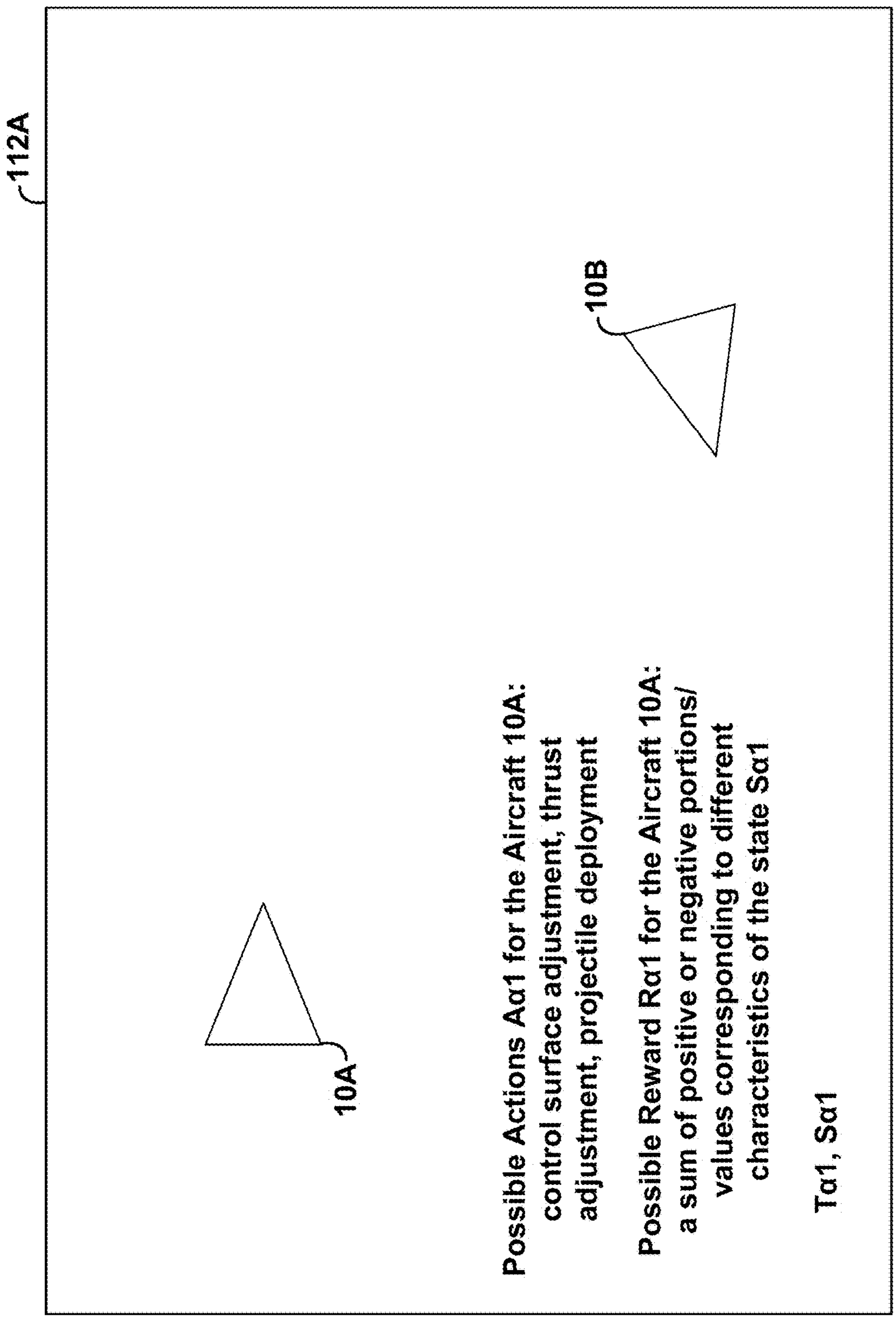
FIG. 3 is a schematic diagram of an environment including two aircraft, according to an example.

FIG. 3 shows the environment 112A characterized by the state Sα1 at the time interval Tα1 that is immediately subsequent to the time interval Tα0. The successive time intervals Tα0, Tα1, Tα2, . . . Tαx could each be equal to 0.25 seconds, but other examples are possible. In this example, the state Sα1 of the environment 112A can be defined as the aircraft 10A having an easterly heading (e.g., a bearing of 90°), a 20° upward pitch, a velocity of 150 m/s, and an altitude of 10,050 feet, and the aircraft 10B having a west southwesterly heading (e.g., a bearing of 250°), a 15° downward pitch, a velocity of 160 m/s, and an altitude of 14,975 feet.

The computing device 100 also updates the agent 115 based on rewards Rα1, Rα2, . . . Rα(x+1) that correspond respectively to the states Sα1, Sα2, . . . Sα(x+1). In this context, the rewards Rα1, Rα2, . . . Rα(x+1) are determined based on rules of the environment 112A.

As such, the computing device 100 updates the agent 115 based on a reward Rα1 corresponding to the state Sα1. The computing device 100 or another computing device simulating the environment 112A determines or calculates the reward Rα1 based on the state Sα1 of the environment 112A. The rewards Rα1, Rα2, . . . Rα(x+1) corresponding respectively to the states Sα1, Sα2, . . . Sα(x+1) can each generally be a sum of positive or negative portions of the rewards Rα1, Rα2, . . . Rα(x+1), with each portion corresponding to different characteristics of each particular state, as described in more detail below. The computing device 100 updating the agent 115 based on the rewards Rα1, Rα2, . . . Rα(x+1) generally involves the computing device 100 updating the agent 115 to change probabilities that the agent 115 selects the actions Aα1, Aα2, . . . Aα(x+1) in response to observing the respective states Sα1, Sα2, . . . Sα(x+1). More particularly, the agent 115 receiving positive rewards will generally increase the probability that the agent 115 selects a particular set of one or more actions again in response to encountering the same state in the environment 112A or another environment such as the environment 112B discussed below. Additionally, the agent 115 receiving negative rewards will generally decrease the probability that the agent 115 selects a particular set of one or more actions again in response to encountering the same state in the environment 112A or another environment such as the environment 112B.

For example, the computing device 100 determines the rewards Rα1, Rα2, . . . Rα(x+1) based on a degree to which, during each of the time intervals Tα0, Tα1, Tα2, . . . Tαx, a position, an orientation, a velocity, or an altitude of the aircraft 10A improved with respect to the aircraft 10A following the aircraft 10B within the environment 112A.

As such, the computing device 100 determines the reward Rα1 based on a degree to which, during the time interval Tα0, a position, an orientation, a velocity, or an altitude of the aircraft 10A improved with respect to the aircraft 10A following the aircraft 10B within the environment 112A. As an initial matter, the computing device 100 determines that a forward end of the aircraft 10A is better aligned with an aft end of the aircraft 10B than the forward end of the aircraft 10B is aligned with the aft end of the aircraft 10A, meaning that the aircraft 10A is advantageously positioned relative to the aircraft 10B and should maneuver to pursue the aircraft 10B instead of maneuvering to evade the aircraft 10B.

For example, the aircraft 10A has decreased its distance to the aircraft 10B at the end of the time interval Tα0 (e.g., the beginning of the time interval Tα1), which tends to result in the environment 112A generating a positive reward Rα1. The aircraft 10A has also better oriented the forward end of the aircraft 10A toward the aft end of the aircraft 10B at the beginning of the time interval Tα1, which tends to result in the environment 112A generating a positive reward Rα1. The aircraft 10A has also better matched the altitude of the aircraft 10A with the altitude of the aircraft 10B, which tends to result in the environment 112A generating a positive reward Rα1. In a similar fashion, the aircraft 10A becoming more distant from the aircraft 10B, the forward end of the aircraft 10A becoming less oriented toward the aft end of the aircraft 10B, and the difference in altitudes of the aircraft 10A and the aircraft 10B increasing would tend to generate a negative reward Rα1 when the aircraft 10A is advantageously positioned relative to the aircraft 10B.

Additionally or alternatively, the computing device 100 determines the rewards Rα1, Rα2, . . . Rα(x+1) based on whether the altitude of the aircraft 10A is less than or equal to the threshold altitude (e.g., zero) during each of the time intervals Tα0, Tα1, Tα2, . . . Tαx or whether a training session within the environment 112A has expired. For example, if the aircraft 10A survives without crashing for a predetermined number of time intervals such as x=10,000 or x=100,000, a positive reward Rα(x+1) is returned by the environment 112A. Positive rewards can be returned for each time interval during which the aircraft 10A does not crash and a negative reward can be returned for the time interval during which the aircraft 10A crashes. This negative reward can be proportional to a number of time intervals remaining in the training session when the aircraft 10A crashes, which tends to dissuade actions that cause the aircraft 10A to crash early (e.g., quickly) in the training session.

Additionally or alternatively, the computing device 100 determines the rewards Rα1, Rα2, . . . Rα(x+1) based on a degree to which, during each of the time intervals Tα0, Tα1, Tα2, . . . Tαx, the altitude of the aircraft 10A is less than a secondary threshold altitude (e.g., 1,000 feet) that is greater than the first threshold altitude (e.g., 0 feet). For example, if the altitude of the aircraft 10A becomes 800 feet during a time interval Tαy, then the reward Rα(y+1) could be negative and proportional to 200 feet, which is the difference between 800 feet and 1,000 feet.

Figure 4:
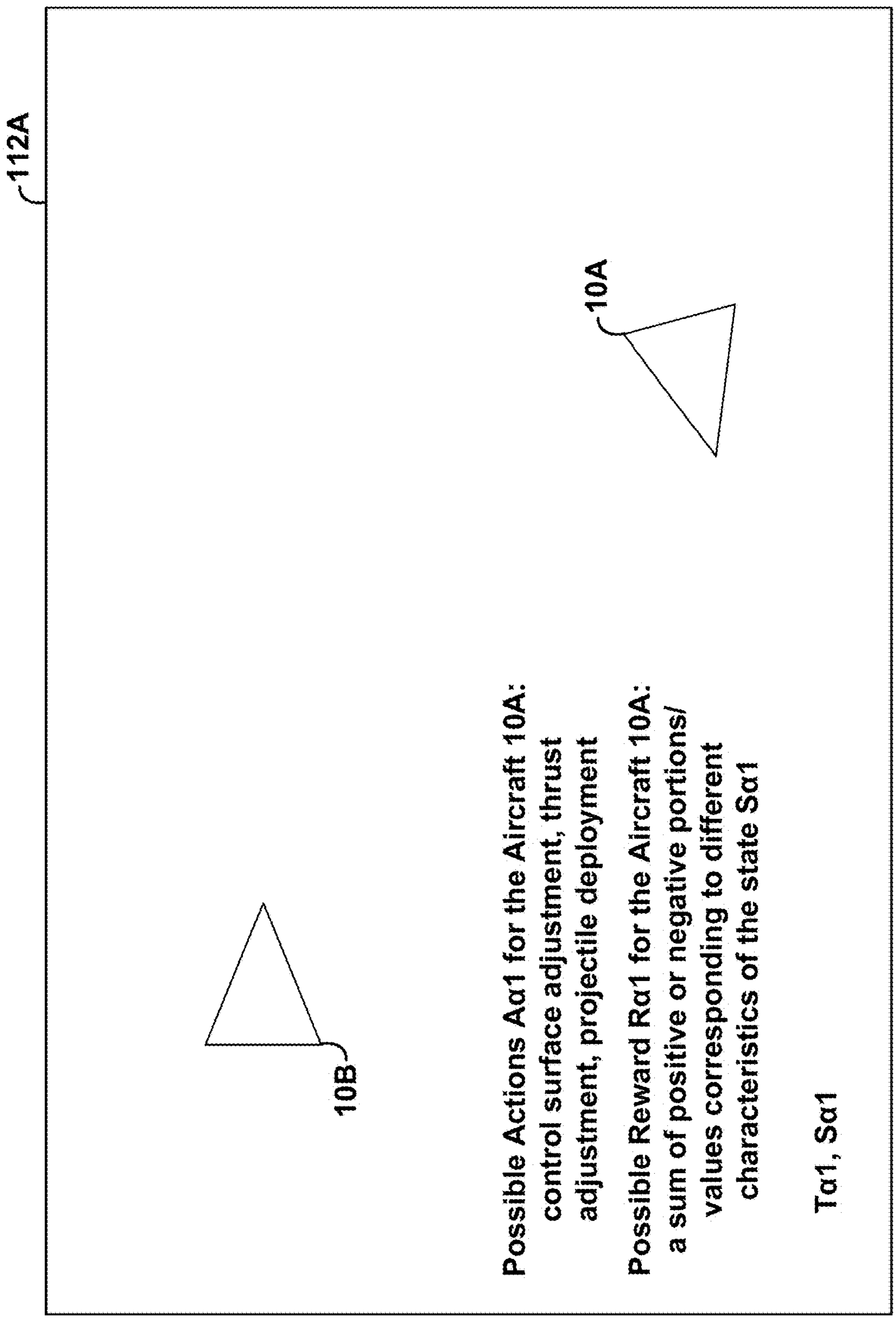
FIG. 4 is a schematic diagram of an environment including two aircraft, according to an example.

In the example of FIG. 4, the computing device 100 determines that a forward end of the aircraft 10B is better aligned with an aft end of the aircraft 10A than the forward end of the aircraft 10A is aligned with the aft end of the aircraft 10B, meaning that the aircraft 10A is disadvantageously positioned relative to the aircraft 10B and should maneuver to evade the aircraft 10B.

For example, the aircraft 10A has decreased its distance to the aircraft 10B at the end of the time interval Tα0 (e.g., the beginning of the time interval Tα1), which tends to result in the environment 112A generating a negative reward Rα1. The aircraft 10B has also better oriented the forward end of the aircraft 10B toward the aft end of the aircraft 10A at the beginning of the time interval Tα1, which tends to result in the environment 112A generating a negative reward Rα1. The aircraft 10A has also better matched the altitude of the aircraft 10A with the altitude of the aircraft 10B, which tends to result in the environment 112A generating a negative reward Rα1. In a similar fashion, the aircraft 10A becoming more distant from the aircraft 10B, the forward end of the aircraft 10B becoming less oriented toward the aft end of the aircraft 10A, and the difference in altitudes of the aircraft 10A and the aircraft 10B increasing would tend to generate a positive reward Rα1 when the aircraft 10A is disadvantageously positioned relative to the aircraft 10B.

Figure 5:
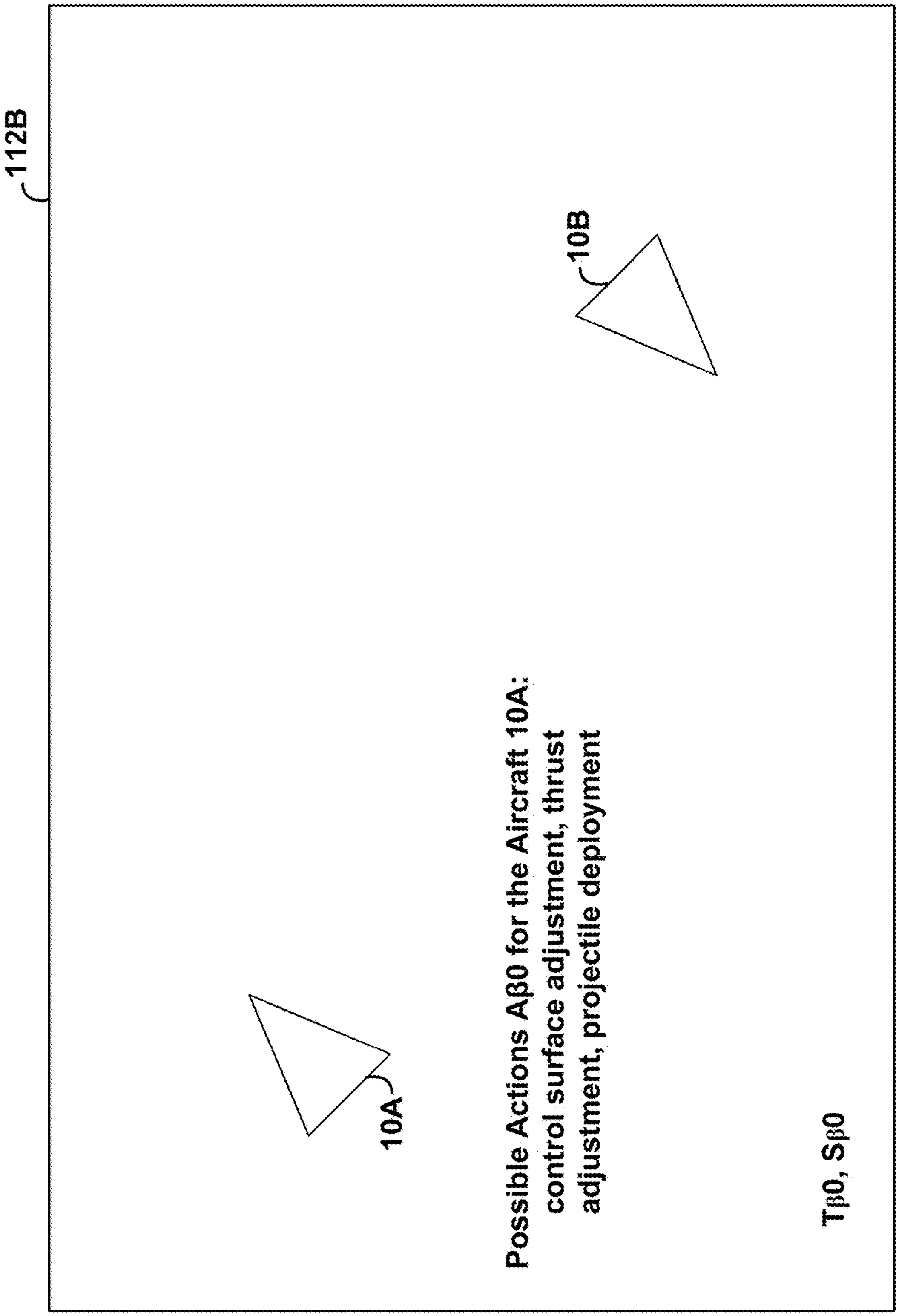
FIG. 5 is a schematic diagram of an environment including two aircraft, according to an example.

FIG. 5 shows an environment 112B that includes the aircraft 10A and the aircraft 10B. Generally, the environment 112B is used to train the agent 115 on advanced flight techniques after the environment 112A is used to train the agent 115 on basic flight techniques. As shown, the initial conditions of the environment 112B include the aircraft 10A and an aircraft 10B being positioned such that neither the aircraft 10A nor the aircraft 10B has an offensive advantage compared to the other aircraft (e.g., neither aircraft has a forward end more oriented toward an aft end of the other aircraft when compared to the other aircraft), but other initial conditions are possible, as discussed below. The environment 112B is a virtual (e.g., simulated) environment generated by the computing device 100. In some examples, rules of the environment 112B allow the aircraft 10A to be destroyed when the altitude of the aircraft 10A becomes less than or equal to a threshold altitude such as zero or when a projectile deployed by the aircraft 10B intercepts the aircraft 10A. The rules of the environment 112B generally provide for a negative reward (e.g., a penalty) to be provided to the agent 115 if the aircraft 10A crashes, drops to the threshold altitude such as zero, or is destroyed by a projectile deployed by the aircraft 10B. Additionally, the rules of the environment 112B can provide positive rewards for each time interval Tβ0, Tβ1, Tβ2, . . . Tβx the aircraft 10A is above a non-zero altitude such as 1,000 feet and for each time interval Tβ0, Tβ1, Tβ2, . . . Tβx the aircraft 10A is positioned favorably and/or improves its position for deploying a projectile at the aircraft 10B (e.g., behind the aircraft 10B and oriented toward the aircraft 10B). The environment 112B can also provide a positive reward if a projectile deployed by the aircraft 10A intercepts the aircraft 10B.

States Sβ0, Sβ1, Sβ2, . . . Sβx corresponding respectively to time intervals Tβ0, Tβ1, Tβ2, . . . Tβx of the environment 112B can be modeled using (1) equations related to physical laws of gravity, aerodynamics, or classical mechanics, (2) performance capabilities of the aircraft 10A and/or its projectiles, and (3) performance capabilities of the aircraft 10B and its projectiles. The states Sβ0-Sβx define the condition of the environment 112B at the corresponding time intervals Tβ0-Tβx and can include (1) a position, an orientation, a velocity, or an altitude of the aircraft 10A and/or of the 10B aircraft, (2) a number of projectiles remaining for deployment by the aircraft 10A and/or the aircraft 10B, and/or (3) a position, an orientation, a velocity, or an altitude of a projectile deployed by the aircraft 10A and/or the 10B aircraft.

In an initial training session involving the environment 112B, the agent 115 is generally initialized with probabilities of selecting particular actions for performance by the aircraft 10A in response to encountering or observing various potential states of the environment 112B. The initialized probabilities are developed or refined via training of the agent 115 within the environment 112A. A training session within the environment 112B generally lasts for a predetermined number of time intervals or until the aircraft 10A is destroyed by crashing into the ground or sea, the aircraft 10A is intercepted by a projectile deployed by the aircraft 10B, or the aircraft 10B is intercepted by a projectile deployed by the aircraft 10A. Typically, the computing device 100 trains the agent 115 using hundreds or thousands of training sessions within the environment 112B after training the agent 115 using hundreds or thousands of training sessions within the environment 112A.

For example, the agent 115 selects actions Aβ0, Aβ1, Aβ2, . . . Aβx for the aircraft 10A to perform within the environment 112B respectively during the time intervals Tβ0, Tβ1, Tβ2, . . . Tβx based on the states Sβ0, Sβ1, Sβ2, . . . Sβx of the environment 112B during the time intervals Tβ0, Tβ1, Tβ2, . . . Tβx.

In FIG. 5, the environment 112B is defined by an initial state Sβ0 corresponding to an initial time interval Tβ0. As such, the agent 115 operated by the computing device 100 selects one or more actions Aβ0 for performance by the aircraft 10A during the time interval Tβ0 based on the state Sβ0. The actions Aβ0 can include one or more of an adjustment of a control surface of the aircraft 10A, a thrust adjustment for the aircraft 10A, or a deployment of a projectile from the aircraft 10A. In some examples, the aircraft 10A will automatically deploy a projectile (e.g., if available) to intercept the aircraft 10B when two conditions are satisfied simultaneously: (1) the aircraft 10A is positioned within a threshold distance of the aircraft 10B and (2) the aircraft 10A is positioned and oriented such that the aircraft 10B is positioned within a predefined bearing range of the aircraft 10A.

For example, the state Sβ0 of the environment 112B can be defined as the aircraft 10A having a northeasterly heading (e.g., a bearing of 45°), a level pitch, a velocity of 200 m/s, and an altitude of 10,000 feet, and the aircraft 10B having a southwesterly heading (e.g., a bearing of 225°), a level pitch, a velocity of 200 m/s, and an altitude of 15,000 feet. As an example, the agent 115 uses probabilities learned during training within the environment 112A to stochastically select the actions Aβ0 in the form of a starboard yaw action, an upward pitch action, and a thrust decrease action for the aircraft 10A to perform during the time interval Tβ0 based on the state Sβ0.

Figure 6:
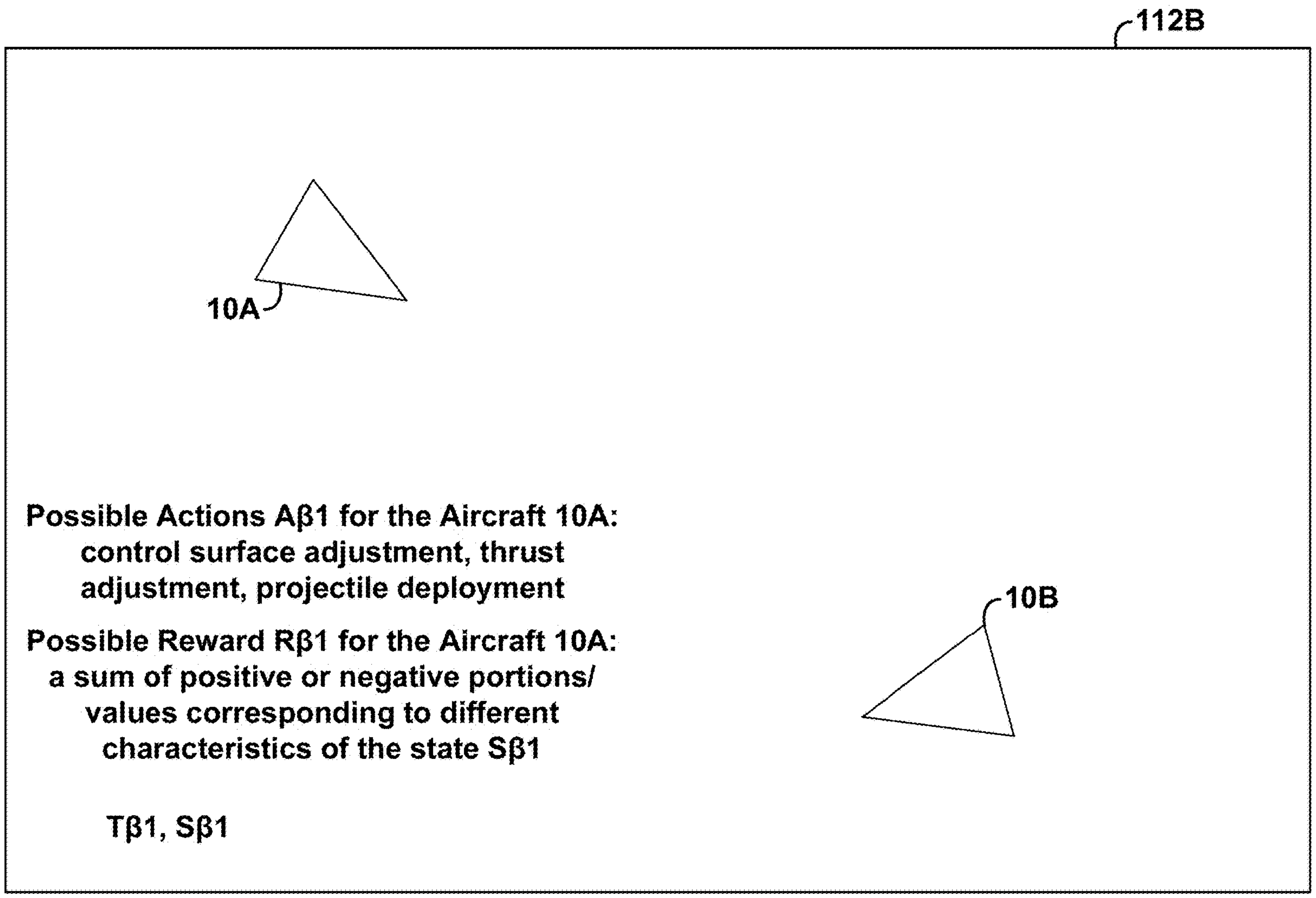
FIG. 6 is a schematic diagram of an environment including two aircraft, according to an example.

FIG. 6 shows the environment 112B characterized by the state Sβ1 at the time interval Tβ1 that is immediately subsequent to the time interval Tβ0. The successive time intervals Tβ0, Tβ1, Tβ2, . . . Tβx could each be equal to 0.25 seconds, but other examples are possible. In this example, the state Sβ1 of the environment 112B can be defined as the aircraft 10A having a southeasterly heading (e.g., a bearing of 135°), a 20° upward pitch, a velocity of 150 m/s, and an altitude of 10,050 feet, and the aircraft 10B having a west southwesterly heading (e.g., a bearing of 250°), a 15° downward pitch, a velocity of 160 m/s, and an altitude of 14,975 feet.

The computing device 100 also updates the agent 115 based on rewards Rβ1, Rβ2, . . . Rβ(x+1) that correspond respectively to the states Sβ1, Sβ2, . . . Sβ(x+1). In this context, the rewards Rβ1, Rβ2, . . . Rβ(x+1) are determined based on rules of the environment 112B.

As such, the computing device 100 updates the agent 115 based on a reward Rβ1 corresponding to the state Sβ1. That is, the computing device 100 or another computing device simulating the environment 112B determines or calculates the reward Rβ1 based on the state Sβ1 of the environment 112B. The rewards Rβ1, Rβ2, . . . Rβ(x+1) corresponding respectively to the states Sβ1, Sβ2, . . . Sβ(x+1) can each generally be a sum of positive or negative portions of the rewards Rβ1, Rβ2, . . . Rβ(x+1), with each portion corresponding to different characteristics of each particular state, as described in more detail below. The computing device 100 updating the agent 115 based on the rewards Rβ1, Rβ2, . . . Rβ(x+1) generally involves the computing device 100 updating the agent 115 to change probabilities that the agent 115 selects the actions Aβ1, Aβ2, . . . Aβ(x+1) in response to observing the respective states Sβ1, Sβ2, . . . Sβ(x+1). More particularly, the agent 115 receiving positive rewards will generally increase the probability that the agent 115 selects a particular set of one or more actions again in response to encountering the same state in the environment 112B or another environment. Additionally, the agent 115 receiving negative rewards will generally decrease the probability that the agent 115 selects a particular set of one or more actions again in response to encountering the same state in the environment 112B or another environment.

For example, the computing device 100 determines the rewards Rβ1, Rβ2, . . . Rβ(x+1) based on a degree to which, during each of the time intervals Tβ0, Tβ1, Tβ2, . . . Tβx, a position, an orientation, a velocity, or an altitude of the aircraft 10A improved with respect to the aircraft 10A following the aircraft 10B within the environment 112B.

As such, the computing device 100 determines the reward Rβ1 based on a degree to which, during the time interval Tβ0, a position, an orientation, a velocity, or an altitude of the aircraft 10A improved with respect to the aircraft 10A following the aircraft 10B within the environment 112B. As an initial matter, the computing device 100 determines that a forward end of the aircraft 10A is better aligned with an aft end of the aircraft 10B than the forward end of the aircraft 10B is aligned with the aft end of the aircraft 10A, meaning that the aircraft 10A is advantageously positioned relative to the aircraft 10B and should maneuver to pursue the aircraft 10B instead of maneuvering to evade the aircraft 10B.

For example, the aircraft 10A has decreased its distance to the aircraft 10B at the end of the time interval Tβ0 (e.g., the beginning of the time interval Tβ1), which tends to result in the environment 112B generating a positive reward Rβ1. The aircraft 10A has also better oriented the forward end of the aircraft 10A toward the aft end of the aircraft 10B at the beginning of the time interval Tβ1, which tends to result in the environment 112B generating a positive reward Rβ1. The aircraft 10A has also better matched the altitude of the aircraft 10A with the altitude of the aircraft 10B, which tends to result in the environment 112B generating a positive reward Rβ1. In a similar fashion, the aircraft 10A becoming more distant from the aircraft 10B, the forward end of the aircraft 10A becoming less oriented toward the aft end of the aircraft 10B, and the difference in altitudes of the aircraft 10A and the aircraft 10B increasing would tend to generate a negative reward Rβ1 when the aircraft 10A is advantageously positioned relative to the aircraft 10B.

Additionally or alternatively, the computing device 100 determines the rewards Rβ1, Rβ2, . . . Rβ(x+1) based on whether the altitude of the aircraft 10A is less than or equal to the threshold altitude (e.g., zero) during each of the time intervals Tβ0, Tβ1, Tβ2, . . . Tβx or whether a training session within the environment 112B has expired. For example, if the aircraft 10A survives without crashing for a predetermined number of time intervals such as x=10,000 or x=100,000, a positive reward Rβ(x+1) is returned by the environment 112B. Positive rewards can be returned for each time interval during which the aircraft 10A does not crash and a negative reward can be returned for a final time interval during which the aircraft 10A crashes. This negative reward can be proportional to a number of time intervals remaining in the training session when the aircraft 10A crashes, which tends to dissuade actions that cause the aircraft 10A to crash early (e.g., quickly) in the training session.

Additionally or alternatively, the computing device 100 determines the rewards Rβ1, Rβ2, . . . Rβ(x+1) based on a degree to which, during each of the time intervals Tβ0, Tβ1, Tβ2, . . . Tβx, the altitude of the aircraft 10A is less than a secondary threshold altitude (e.g., 1,000 feet) that is greater than the first threshold altitude (e.g., 0 feet). For example, if the altitude of the aircraft 10A becomes 800 feet during a time interval Toy, then the reward Rβ(y+1) could be negative and proportional to 200 feet, which is the difference between 800 feet and 1,000 feet.

Figure 7:
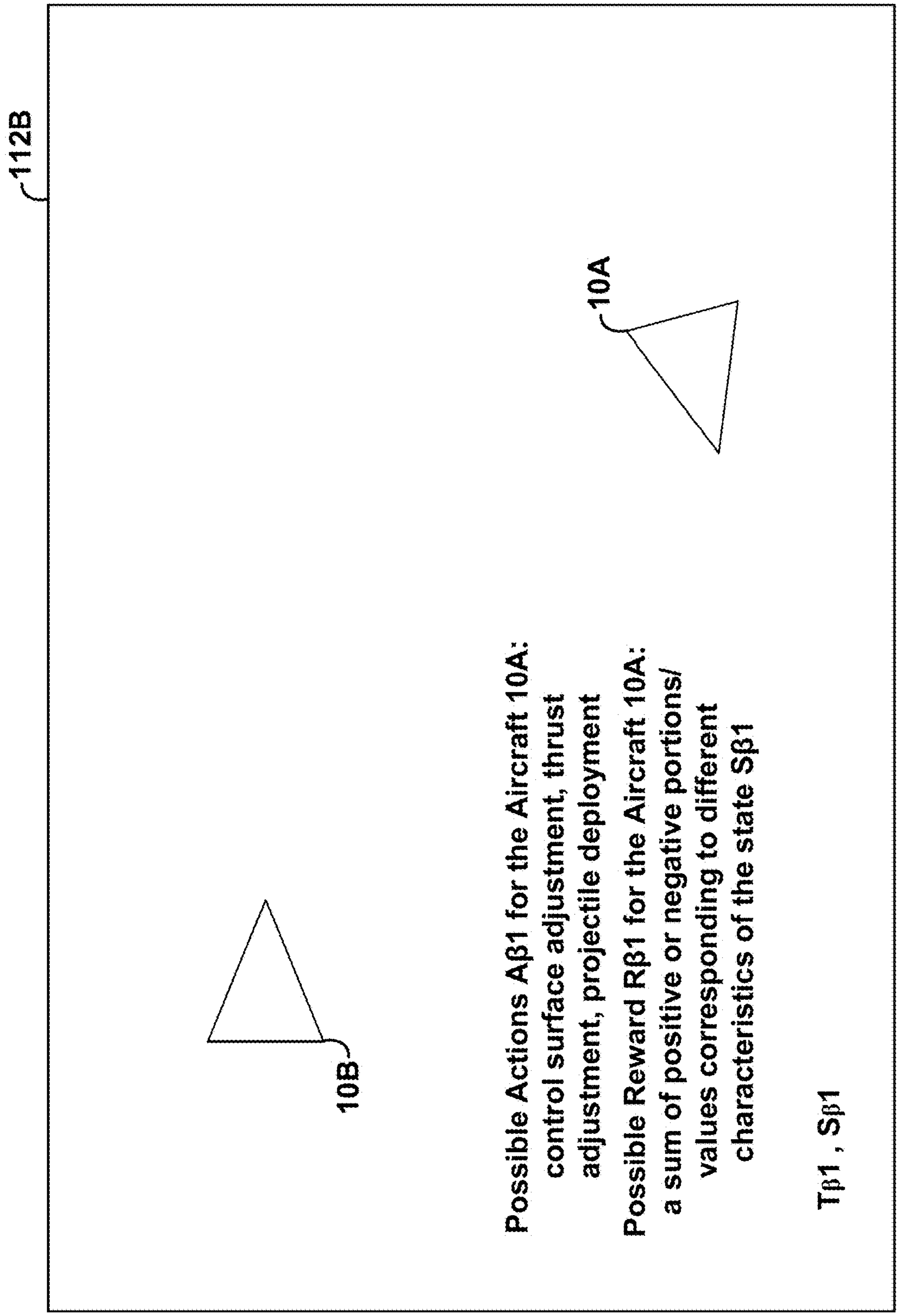
FIG. 7 is a schematic diagram of an environment including two aircraft, according to an example.

In the example of FIG. 7, the computing device 100 determines that a forward end of the aircraft 10B is better aligned with an aft end of the aircraft 10A than the forward end of the aircraft 10A is aligned with the aft end of the aircraft 10B, meaning that the aircraft 10A is disadvantageously positioned relative to the aircraft 10B and should maneuver to evade the aircraft 10B.

For example, the aircraft 10A has decreased its distance to the aircraft 10B at the end of the time interval Tβ0 (e.g., the beginning of the time interval Tβ1), which tends to result in the environment 112B generating a negative reward Rβ1. The aircraft 10B has also better oriented the forward end of the aircraft 10B toward the aft end of the aircraft 10A at the beginning of the time interval Tβ1, which tends to result in the environment 112B generating a negative reward Rβ1. The aircraft 10A has also better matched the altitude of the aircraft 10A with the altitude of the aircraft 10B, which tends to result in the environment 112B generating a negative reward Rβ1. In a similar fashion, the aircraft 10A becoming more distant from the aircraft 10B, the forward end of the aircraft 10B becoming less oriented toward the aft end of the aircraft 10A, and the difference in altitudes of the aircraft 10A and the aircraft 10B increasing would tend to generate a positive reward Rβ1 when the aircraft 10A is disadvantageously positioned relative to the aircraft 10B, as shown in FIG. 7.

In various examples, the rules of the environment 112B dictate that the aircraft 10A and the aircraft 10B have random positions, random orientations, and random altitudes within the environment 112B at the initial time interval of Tβ0.

In other examples, the rules of the environment 112B dictate that, at the initial time interval of Tβ0, the aircraft 10A is placed and oriented such that a first angle formed by a first heading of the aircraft 10A and the aircraft 10B is smaller than a second angle formed by a second heading of the aircraft 10B and the aircraft 10A. That is, a forward end of the aircraft 10A is more aligned with the aft end of the aircraft 10B when compared to the alignment of the forward end of the aircraft 10B with the aft end of the aircraft 10A. In some examples, the agent is trained with hundreds or thousands of training sessions having advantageous initial placement of the aircraft 10A within the environment 112B after hundreds or thousands of training sessions within the environment 112B having random initial placement of the aircraft 10A and the aircraft 10B within the environment 112B.

In other examples, the rules of the environment 112B dictate that, at the initial time interval of Tβ0, the aircraft 10A is placed and oriented such that a first angle formed by a first heading of the aircraft 10A and the aircraft 10B is equal to a second angle formed by a second heading of the aircraft 10B and the aircraft 10A. That is, a forward end of the aircraft 10A is equally aligned with the aft end of the aircraft 10B when compared to the alignment of the forward end of the aircraft 10B with the aft end of the aircraft 10A. In some examples, the agent is trained with hundreds or thousands of training sessions having equal or fair initial placement of the aircraft 10A within the environment 112B after hundreds or thousands of training sessions within the environment 112B having advantageous initial placement of the aircraft 10A with respect to the aircraft 10B within the environment 112B.

Figure 8:
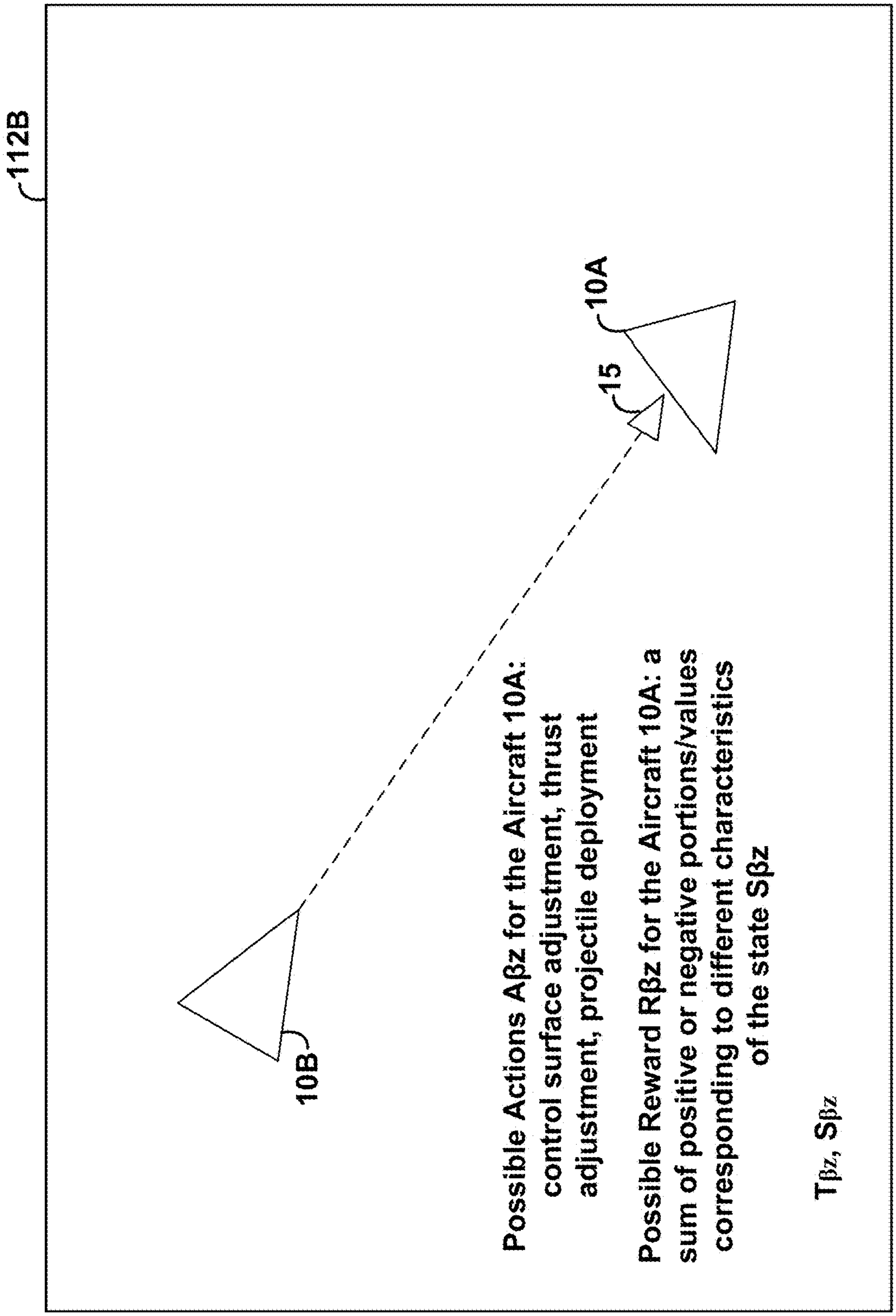
FIG. 8 is a schematic diagram of an environment including two aircraft and a projectile, according to an example.

FIG. 8 shows an example of the environment 112B in which the aircraft 10B deploys a projectile 15 that intercepts the aircraft 10A. Accordingly, the computing device 100 can determine the rewards Rβ1, Rβ2, . . . Rβ(x+1) based on whether the aircraft 10A is destroyed by the projectile 15 deployed by the aircraft 10B during each of the second time intervals Tβ0, Tβ1, Tβ2, . . . Tβx. Referring to FIG. 8 in particular, the projectile 15 intercepts and destroys the aircraft 10A and the environment 112B returns a negative portion of a reward Rβz corresponding to the time interval Tβz based on the state Sβz being characterized by the aircraft 10A being destroyed by the projectile 15. The negative portion of the reward Rβz can be proportional to a number of time intervals remaining in the training session within the environment 112B when the aircraft 10A is destroyed by the projectile 15 deployed by the aircraft 10B.

Figure 9:
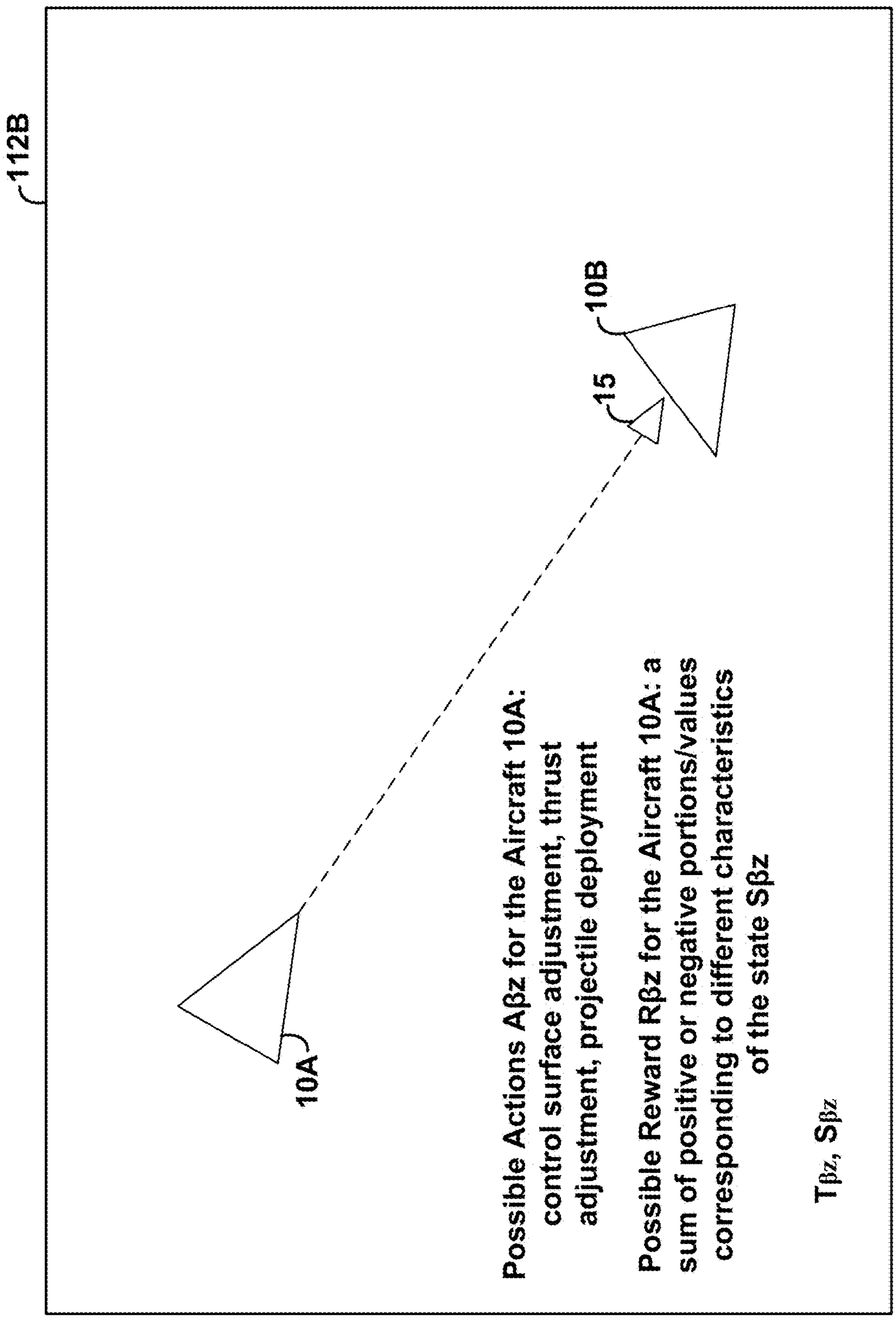
FIG. 9 is a schematic diagram of an environment including two aircraft and a projectile, according to an example.
Figure 10:
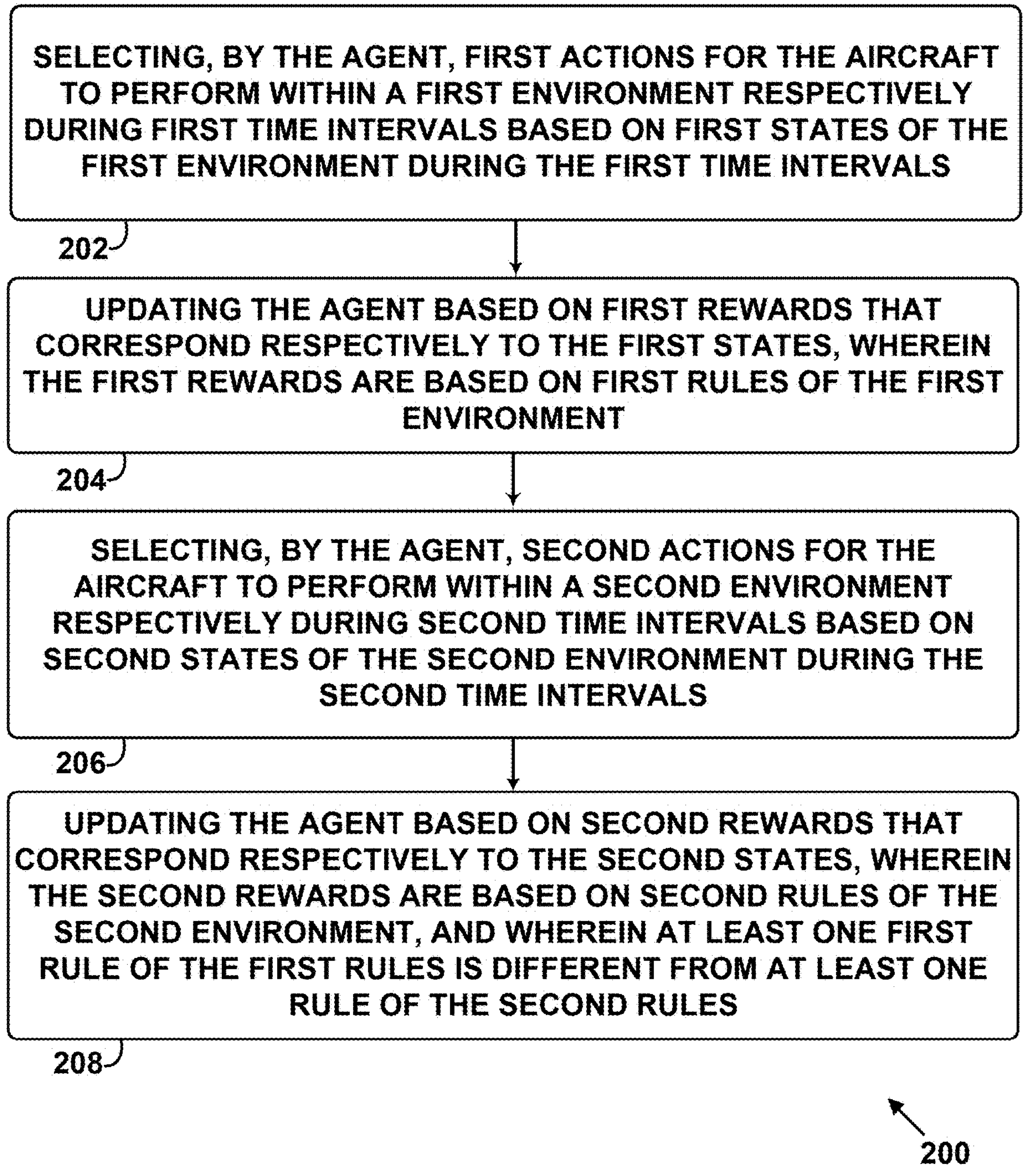
FIG. 10 is a block diagram of a method, according to an example.

FIG. 9 shows an example of the environment 112B in which the aircraft 10A deploys a projectile 15 that intercepts the aircraft 10B. Accordingly, the computing device 100 can determine the rewards Rβ1, Rβ2, . . . Rβ(x+1) based on whether the aircraft 10B is destroyed by the projectile 15 deployed by the aircraft 10A during each of the second time intervals Tβ0, Tβ1, Tβ2, . . . Tβx. Referring to FIG. 9 in particular, the projectile 15 intercepts and destroys the aircraft 10B and the environment 112B returns a positive portion of a reward Rβz corresponding to the time interval Tβz based on the state Sβz being characterized by the aircraft 10B being destroyed by the projectile 15. The positive portion of the reward Rβz can be proportional to a number of time intervals remaining in the training session within the environment 112B when the aircraft 10B is destroyed by the projectile 15 deployed by the aircraft 10A.

In some examples, the agent 115 is loaded onto a computing system of an actual fighter aircraft or UAV after the agent 115 is trained using the environment 112A and the environment 112B. In this way, the agent 115 can be used to control real aircraft in real aviation settings.

FIG. 10, FIG. 11, FIG. 12, FIG. 13, FIG. 14, FIG. 15, and FIG. 16 are block diagrams of a method 200, a method 250, a method 255, a method 260, a method 265, a method 270, and a method 275 for training the agent 115 to control the aircraft 10A. As shown in FIGS. 10-16, the methods 200-275 include one or more operations, functions, or actions as illustrated by blocks 202, 204, 206, 208, 210, 212, 214, 216, 218, and 220. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 202, the method 200 includes selecting, by the agent 115, the actions Aα for the aircraft 10A to perform within the environment 112A respectively during the time intervals Tα based on the states Sα of the environment 112A during the time intervals Tα. Functionality related to block 202 is discussed above with reference to FIGS. 2-4.

At block 204, the method 200 includes updating the agent 115 based on the rewards Rα that correspond respectively to the states Sα. The rewards Rα are based on the rules of the environment 112A. Functionality related to block 204 is discussed above with reference to FIGS. 2-4.

At block 206, the method 200 includes selecting, by the agent 115, the actions Aβ for the aircraft 10A to perform within the environment 112B respectively during the time intervals $T_\beta$ based on the states $S_\beta$ of the environment 112B during the time intervals $T_\beta$. Functionality related to block 206 is discussed above with reference to FIGS. 5-9.

At block 208, the method 200 includes updating the agent 115 based on the rewards $R_\beta$ that correspond respectively to the states $S_\beta$. The rewards $R_\beta$ are based on the rules of the environment 112B. At least one rule of the environment 112A is different from at least one rule of the environment 112B. Functionality related to block 208 is discussed above with reference to FIGS. 5-9.

At block 210, the method 250 includes determining the rewards Rα based on whether the altitude of the aircraft 10A is less than or equal to the threshold altitude during each of the time intervals Tα or whether a training session within the environment 112A has expired. Functionality related to block 210 is discussed above with reference to FIGS. 2-4.

At block 212, the method 250 includes determining the rewards Rα based on a degree to which, during each of the time intervals Tα, a position, an orientation, a velocity, or the altitude of the aircraft 10A improved with respect to the aircraft 10A following the aircraft 10B within the environment 112A. Functionality related to block 212 is discussed above with reference to FIGS. 2-4.

At block 214, the method 260 includes determining the rewards $R_\beta$ based on whether the altitude of the aircraft 10A is less than or equal to the threshold altitude during each of the time intervals $T_\beta$ or whether a training session within the environment 112B has expired. Functionality related to block 214 is discussed above with reference to FIGS. 5-9.

At block 216, the method 265 includes determining the rewards $R_\beta$ based on a degree to which, during each of the time intervals $T_\beta$, a position, an orientation, a velocity, or the altitude of the aircraft 10A improved with respect to the aircraft 10A following the aircraft 10B within the environment 112B. Functionality related to block 216 is discussed above with reference to FIGS. 5-9.

At block 218, the method 270 includes determining the rewards $R_\beta$ based on whether the aircraft 10A is destroyed by a projectile 15 deployed by the aircraft 10B during each of the time intervals $T_\beta$. Functionality related to block 218 is discussed above with reference to FIG. 8.

At block 220, the method 275 includes using the agent 115 to control a non-simulated aircraft.

Further Examples

Simulation Framework

The framework was implemented using the Advanced Framework for Simulation, Integration and Modeling (AFSIM) as a simulation engine. However, any advanced flight simulation engine (such as JSBSim) that is capable of simulating the physics of aircraft flight dynamics could be used. In this usage, a within visual range scenario was developed. It features 6 degree of freedom aircraft movement modeling with simplified attitude (pitch/yaw/roll) kinematics (P6DOF" "Psuedo-6DoF"). The scenario includes realistic physics and aerodynamics modelling including aircraft angle-of-attack and angle-of-sideslip effects. The simulation steps through the scenario in discrete time increments, updating positions of aircraft according to simulated physics and their controller issued, continuous valued controls. The scenario of "1-v-1" (one agent to be trained against one opponent agent controlled by deterministic rules or a pre-trained agent) was formulated as a reinforcement learning environment according to the OpenAI "gym" specification. A Python interface matching this specification was developed which was used to train agents using the Soft Actor-Critic (SAC) algorithm.

Reinforcement Learning Formulation

In reinforcement learning, the agent being trained interacts with the environment (in our case, the AFSIM P6DOF simulation) by applying control input in one time interval and observing the output (the reaction or changes) in the environment in the next time interval. An additional numeric output, provided at each time interval to the training algorithm, but not to the controller is the reward for the agent. The input, output, the reward and whether the simulation has reached the end (due to one side winning, or time limit being exceeded) collectively constitutes a data point for training.

The engagement simulation steps through 1000 time intervals, for example. The simulation terminates early if one aircraft is hit by a projectile or crashed by flying too low to 0 altitude. A win is declared for the surviving aircraft, and a loss is declared for the destroyed aircraft. If both survive through the end of the time intervals, a tie is declared. The task for the reinforcement learning algorithm is to control one of the aircraft and achieve a high rate of win. The opponent aircraft is controlled by deterministic rules. The interface made available to the agent consists of a reinforcement learning observation space and continuous action space.

At each time interval, the observation space features positional information of the aircraft and its opponent in a coordinate system relative to the aircraft, or in other words, centered on the aircraft and aligned with its heading. The agent is also provided situational information regarding projectiles. Additionally, the agent receives the position of the opponent's closest incoming projectile. If no projectile is incoming, the agent instead receives a default observation of a projectile positioned far enough away to pose no threat.

The action space consists of continuous valued controls which mimic the movement controls available to a pilot, especially the control stick, rudder pedals, and throttle. At each time interval, the agent generates a continuous value for each of the action space variable components, and the simulation engine will update to the next time interval according to controls and simulated physics. The tested reinforcement learning algorithm is generally not compatible with mixed discrete and continuous action control. The discrete aspect of control, namely, the decision to deploy a projectile at a given state, is managed by a set of rules. To remain fair, the projectile scripted rules are the same for the trained agent as well as the opponent. The rules deploy when the opponent aircraft is in projectile range, and within a view cone in front of the firing aircraft. Once deployed, guided projectiles fly independently toward the opponent of the aircraft that deployed them and they stop when they hit the opponent and end the scenario, or after finite amount of fuel is depleted and they drastically slow and eventually removed.

Curriculum Learning Configuration

Reinforcement learning formulations include a reward function which defines the optimality of behavior for the trained agent. In the case of this curriculum learning framework, different rewards are used to encourage the algorithm to optimize for increasingly complex behaviors and increasingly difficult goals. In addition to specialized rewards, other environment settings such as the termination conditions are modified to create easier, incremental settings, or in other cases, targeted settings for niche skills. First the full set of rewards and settings used are described, then the combinations of them used in curriculum stages are laid out.

Reward Functions

The learning algorithm seeks to train agents which maximize the expected sum of total rewards accumulated in a simulation run. The agent is not aware of these rewards, but the rewards are used by the training algorithm to optimize the policies defining the agent's behavior. A summary of various rewards is presented in the box below.

This environment provides a "dense" reward at each time interval to encourage certain aspects of behavior and a "terminal" reward only at the last time interval to encourage a higher chance of achieving a win. Rewards may take negative values. These are called penalties, but are used to discourage behaviors. The "Simple Follow" dense reward encourages the controller to match altitude with and turn to face its opponent, and consists of higher values when altitude difference is low, and bearing offset from the opponent is low. The "McGrew" Dense reward is constructed to encourage the controller to reach advantageous positions, defined in terms of distance and the two aircraft's headings. For example, the positions range from most advantageous when behind the opponent aircraft and directly facing the opponent, to the least advantageous when in front of the opponent and facing straight away. These advantages are defined in a 2D space, so an additional component to the McGrew dense reward encourages matching altitude. To discourage the algorithm from training an agent which is likely to crash, a low altitude penalty is given at each time interval, which is 0 when the controlled aircraft is above a certain altitude threshold, in this case, of 1,000 feet or a negative constant when it is below. Finally, a terminal reward is given to the agent at the end of a simulation run (regardless of the reason for the termination), this consists of a raw score, multiplied by the number of remaining time intervals. The raw score is +1 if the controlled aircraft wins and destroys the other aircraft, −1 if the aircraft loses and is destroyed, and −0.5 if the time intervals run out. The multiplication by remaining time intervals is intended to ensure that the total reward acquired through a scenario has a comparable magnitude even in the case of early termination to balance the combined effects of dense and terminal rewards.

Training Configurations

In addition to the various reward functions, various configurations were designed for the simulation runs that can affect training outcomes.

Indestructibility to projectiles causes neither aircraft to be destroyed by projectiles. This relaxes the burdens of avoiding incoming projectiles, and emphasizes positioning to aim projectiles. In early training stages, this reduces the complexity of the agent and allows the aircraft to avoid crashing and explore basic stable flight patterns, or, if dense rewards are added, the reinforcement learning agent may explore complicated sequences of controls meant for pursuing the opponent later in a simulation run without being interrupted by a guided projectile. Initial placement of the controlled aircraft relative to the opponent aircraft has a strong influence in outcome of simulation runs, for example, trivial runs occur if an aircraft starts in an advantageous placement, already behind the adversary, facing it, and in range to deploy a projectile. Random initial placement exposes the reinforcement learning training to diverse scenarios, allowing it to accumulate data from placements ranging from highly advantageous to highly disadvantageous. The offensive initial placement used here restricts the randomization of the two aircrafts' placements, in order to start the controlled aircraft in an advantageous, or offensive placement. Specifically, both aircraft face mostly east, with a small difference in heading, for example in the range [−45, 45] degrees, and while exact position is randomized, the controlled aircraft starts more west, behind the opponent aircraft. This setting focuses the data accumulated by training to ensure that the controlled aircraft follows through, for example, by firing its projectile, maintaining guidance if necessary, or maintaining altitude if dense rewards are used. The Neutral initial placement represents a fair engagement, where neither aircraft begins with an advantage. In this setting, both aircraft begin at the same latitude, with randomized longitude, and one aircraft faces north, while the other faces south. Specifically, it focuses the agent on transitioning into an advantageous placement.

Training Curriculum

In curriculum training, a neural network is trained on a simplified dataset until a simple function is learned. Afterwards, and in subsequent stages, the network trained in the previous stage is loaded for further training while the environment and other conditions and/or rewards are modified to increase complexity so that a more complex function is learned. In this case, multiple stages of increased complexity correspond to settings in the environment coupled with different reward functions. In the simplest, basic flight, indestructibility is enabled, random placement is used, the terminal reward is used, and any of the dense rewards may be used. In this case, the aircraft can only tie or be destroyed by crashing due to poor flight control. The main goal of training is to achieve tie consistently, and reach the end of the simulation run, while optionally optimizing a dense reward function. In experiment, using the McGrew dense reward achieved best qualitatively stable flight and was used in continued training. Afterwards, subsequent stages add the altitude dense penalty. The altitude dense penalty is important for discouraging the agent from making unstable movements for advantages. This is important, because while the simulation run ends with the opponent's destruction, the trained controller may enter an unstable situation such as diving and crashing to reach the ending, or disregard its controls once the projectile becomes able to guide itself. This is related to a phenomenon called "catastrophic forgetting" in reinforcement learning. This would make the trained controller impractical for use outside the particular termination criteria, but a simple way to alleviate this is to add a penalty to regularize its behavior. In this case, the altitude penalty discourages the controller from diving too much. Random engagement is a simple extension, of basic flight, only disabling indestructibility (and using random placement, using the terminal reward, and using the McGrew Dense Reward). Win/loss rates in random engagement are largely biased towards even outcomes due to the strong influence of initial placement, so subsequent stages modify placement. Simple engagement uses an offensive initial placement, to focus agent exploration on final stages of a typical scenario, and Fair engagement is the full, fair simulation scenario, using a neutral initial placement. Other alternative neutral advantage placements exist such as, setting both aircraft facing away or facing both north. The important feature of the final placement is to focus on a particular type of neutral advantage such that the training data allows the trained agent to fill the niche.

Examples below include the process of using curriculum learning for training an agent for air-to-air engagement.

Learning Algorithm

There are many reinforcement learning algorithms that can be used for agents with continuous control. SAC (soft actor-critic) was chosen because it has the performance of on-policy algorithms and the data efficiency of off-policy algorithms. Specifically, the algorithm implementation by OpenAI called "SpinningUp" (https://spinningup.openai.com/en/latest/) was used. The SpinningUp implementation of SAC algorithm is further modified to accommodate the needs for curriculum training, namely, being able to save the training state and weights of the neural networks used in SAC, and the replay buffer contents. The saved state, network weights and replay buffer are collectively referred to as a "checkpoint". The contents of such a checkpoint can be loaded back to SAC training code to restore the algorithm to where left off in a prior curriculum training session, so the networks representing the agent can be trained further in subsequent curriculum session(s) and potentially with a different configuration. FIG. 17 summarizes the network architecture and the parameter/hyper-parameters used for training.

To train the reinforcement learning agents, algorithms are run for at least 250 training epochs consisting of 40,000 training steps, with 5 differently seeded independent training runs. The best performing seeded run is used to continue training in subsequent stages with modifications. To monitor progress during training, at the end of each training epoch, the reinforcement learning algorithm is set to deterministic runtime (not random exploration mode) and tested on 10 simulation runs. The last 100 of such test results are used to gauge win rates (called "scores") from a training run.

Figure 18:
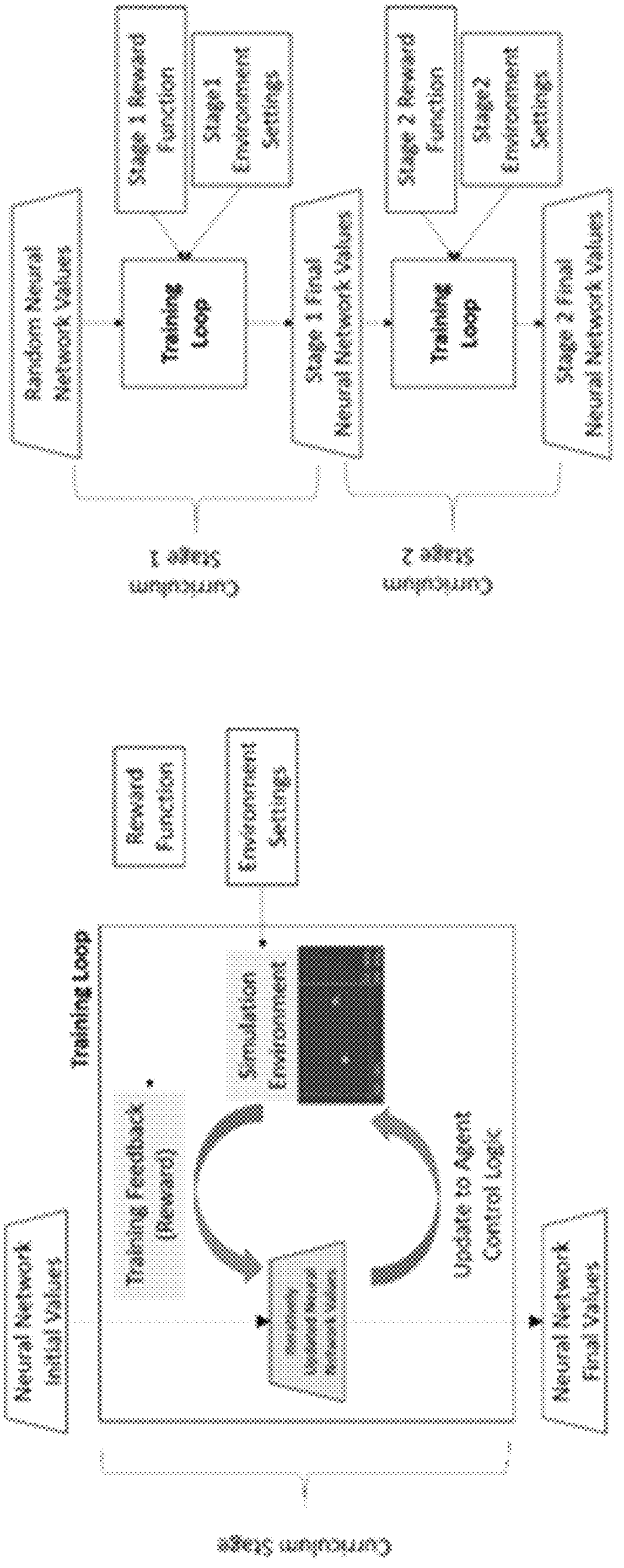
FIG. 18 shows information related to a training algorithm, according to an example.

The curriculum training is carried out in stages. In each stage one specific skill, flying or engagement, becomes the main focus of the training. FIG. 18 illustrates different components involved in training in one of these stages (left), and the processing flow of an example 2-stage curriculum training (right). In practice, more training stages for different curriculum can be employed as described below.

Curriculum Stages

Basic Flight

Training the agent can begin by carrying out Basic Flight training. In this training stage, the agent starts as a blank slate with no knowledge of flying at all, and is set to indestructible so they can experience long exposure to wide ranging flight conditions and learn the basic flight controls without being penalized for being intercepted by projectiles.

McGrew Dense reward is used to encourage the agent to maintain heading toward its opponent and altitude at safe levels, thereby giving training objectives for the agent to learn basic flight control skills. The terminal reward is used to encourage the agent not to fly the aircraft to a crash, because that's the only case the agent can lose and get a negative reward (or penalty) as it will not be destroyed even if intercepted by projectiles deployed by the opponent. The success of Basic Flight training can be measured by the rate the agent achieves tie or draw outcome among the test episodes during training. A 100% tie/draw indicates that the agent has learned to fly capably and will never crash. To achieve this level of flight skill, often the agent is trained for several hundred epochs with each epoch consisting of 40,000 training steps. FIG. 19 shows examples of Basic Flight training using different reward functions after 150 epochs of training.

Random Engagement

Following the Basic Flight training, training continues with the agent in Random Engagement. As described earlier, Random Engagement differs from Basic Flight in that the aircraft are no longer indestructible. Therefore winning by firing projectiles and destroying the opponent will be properly rewarded through the terminal reward. Like in Basic Flight, this training configuration allows maximum exposure to the agent for training all possible encounters with the opponent. To prevent the agent from flying too low to crash the aircraft, Low Altitude Dense Penalty is added to the reward function.

The agent is trained in Random engagement for several rounds, each for 150~300 epochs. In each round, training begins with 5 independent training runs with the same starting point loaded from the checkpoint of the best performing run of the previous round, but with a different random seed. Success of the training runs is defined by observing the test scores achieved during training. Test score is defined as the rate of winning for the trained agent. Training is stopped when the test scores no longer improve or becomes even lower than proceeding round(s). FIG. 20 shows two different Random trainings over 3 rounds of 300 epochs that differ only in whether Low Altitude Penalty was used or not. As can be seen, using Low Altitude Penalty seems to suppress agent performance improvements compared to not using the penalty. In other experiments, however, performance with the Low Altitude Penalty can continue to improve beyond Round 3, whereas in the case of not using Low Altitude Penalty, and performance has already peaked after 3 rounds.

Evaluation and Training for Niche Skills

Another way to measure the performance of an agent after training is to evaluate the performance of the agent by running test sessions with the opponent. The trained agents are evaluated by testing on 100 episodes against the rule based opponent. During evaluation, the agent is set to deterministic runtime mode in the SAC algorithm. The test session can be configured using the same or different initial placement configurations as the one used in training. In the 100 evaluation episodes, there is some randomization to the starting positions so that the 100 evaluations aren't identical, however the range of randomization is small enough that the advantageousness of the initial placements in the 100 evaluation episodes is preserved.

The same configuration is used as the one used in training to test the agent, verifying the scores achieved during training. When a different configuration is used, however, it tests some aspects that may or may not be encapsulated in the configuration with which the training is done. This approach can be thought of a) testing the generalization capability of the agent if the configuration is outside of the one used in training, or b) niche capability evaluation if the configuration has a narrower scope or coverage than is encapsulated in the one used for training. Two different initial placement configurations were designed, one for Simple Engagement and one for Fair Engagement, both of which can be used for training and evaluation, as explained below.

Simple Engagement

Simple Engagement starts with an Offensive initial placement configuration that places the aircraft at an advantage position relative to the opponent. There is a high probability that the agent will be able to win if the agent is properly trained with Random Engagement configuration. Instead, this configuration can be used to evaluate whether the agent is trained sufficiently.

Fair Engagement

In contrast to Simple Engagement, Fair Engagement is a placement configuration that does not give either side any advantage. Therefore it's a "fair" game. It can be thought of being orthogonal to Simple Engagement in terms of skills.

Evaluation

The following examples are training experiments for how Simple Engagement and Fair Engagement come into play in training and evaluation.

FIG. 21 outlines the results after taking a model trained in Random Engagement and continuing in a Fair training stage. Evaluation is done in each placement setting to test if Random Engagement training properly trains the agent in Simple/Fair configuration and whether further curriculum training in Fair Engagement can improve the agent's skill in these configurations.

In the column under the heading "Evaluation after training in Random Engagement" that the performance tested in Random Placement (or Random configuration), 0.53, matches that achieved during training (0.56). Furthermore, the performance in Offensive Placement exceeds that of the Random Placement, indicating the agent was able to take advantage of its position to win, but not by a lot. Finally, the performance in Neutral Placement shows a big short fall (0.49) compared to the training score, which indicates to us that the agent is weak in skills in Fair Engagement.

Moving on to the next column under the heading "Evaluation after training in Fair Engagement", the performance numbers here are achieved after putting the agent evaluated in the previous column through additional 600 epochs of training using Fair Engagement. The score at the top of the column, 0.92, indicates the training is very successful as it attended high winning rate. The next two numbers, 0.55 and 0.66, from evaluating in Random Placement and Offensive Placement re-examine the capabilities the agent learned during the Random Engagement training. They show moderate improvements from the agent before Fair training. Finally, the performance (0.9) in Neutral Placement shows the capability of the agent during training (0.92) is fully verified.

Results here show that focusing the agent's simulation experience to the Fair setting allows it to learn specific skills necessary to achieve high win rate in that setting, while maintaining win rates in other settings.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated.

What is claimed is:

1. A method for training an agent to control an aircraft, the method comprising:

selecting, by the agent, first actions for the aircraft to perform within a first environment respectively during first time intervals based on first states of the first environment during the first time intervals, wherein the agent is a machine learning algorithm operated by a computing device to control the aircraft;

updating the agent based on first rewards that correspond respectively to the first states, wherein the first rewards are based on first rules of the first environment;

selecting, by the agent, second actions for the aircraft to perform within a second environment respectively during second time intervals based on second states of the second environment during the second time intervals; and updating the agent based on second rewards that correspond respectively to the second states, wherein the second rewards are based on second rules of the second environment, and wherein at least one first rule of the first rules is different from at least one rule of the second rules.

2. The method of claim 1, wherein:

updating the agent based on the first rewards comprises updating the agent to change first probabilities that the agent selects the first actions in response to observing the first states, and updating the agent based on the second rewards comprises updating the agent to change second probabilities that the agent selects the second actions in response to observing the second states.

3. The method of claim 1, wherein the first rules of the first environment do not allow the aircraft to be destroyed except for when an altitude of the aircraft becomes less than or equal to a threshold altitude, and wherein updating the agent based on the second rewards comprises updating the agent based on the second rewards after updating the agent based on the first rewards.

4. The method of claim 3, further comprising determining the first rewards based on whether the altitude of the aircraft is less than or equal to the threshold altitude during each of the first time intervals or whether a training session within the first environment has expired.

5. The method of claim 4, wherein determining the first rewards comprises determining the first rewards such that a portion of the first rewards is proportional to a number of time intervals remaining in a training session within the first environment when the altitude of the aircraft became less than or equal to the threshold altitude.

6. The method of claim 4, wherein the threshold altitude is a first threshold altitude, and wherein determining the first rewards comprises determining the first rewards additionally based on a degree to which, during each of the first time intervals, the altitude of the aircraft is less than a second threshold altitude that is greater than the first threshold altitude.

7. The method of claim 4, wherein the aircraft is a first aircraft, the method further comprising determining the first rewards based on a degree to which, during each of the first time intervals, a position, an orientation, a velocity, or the altitude of the first aircraft improved with respect to the first aircraft following a second aircraft within the first environment.

8. The method of claim 3, wherein the aircraft is a first aircraft, and wherein the second rules of the second environment allow the first aircraft to be destroyed when the altitude of the first aircraft becomes less than or equal to the threshold altitude or when a projectile deployed by a second aircraft intercepts the first aircraft.

9. The method of claim 8, further comprising determining the second rewards based on whether the altitude of the first aircraft is less than or equal to the threshold altitude during each of the second time intervals or whether a training session within the second environment has expired.

10. The method of claim 9, wherein determining the second rewards comprises determining the second rewards such that a portion of the second rewards is proportional to a number of time intervals remaining in a training session within the second environment when the altitude of the first aircraft became less than or equal to the threshold altitude.

11. The method of claim 9, wherein the threshold altitude is a first threshold altitude, and wherein determining the second rewards comprises determining the second rewards additionally based on a degree to which, during each of the second time intervals, the altitude of the first aircraft is less than a second threshold altitude that is greater than the first threshold altitude.

12. The method of claim 8, further comprising determining the second rewards based on a degree to which, during each of the second time intervals, a position, an orientation, a velocity, or the altitude of the first aircraft improved with respect to the first aircraft following the second aircraft within the second environment.

13. The method of claim 8, further comprising determining the second rewards based on whether the first aircraft is destroyed by a projectile deployed by the second aircraft during each of the second time intervals.

14. The method of claim 13, wherein determining the second rewards comprises determining the second rewards such that a portion of the second rewards is proportional to a number of time intervals remaining in a training session within the second environment when the first aircraft is destroyed by the projectile deployed by the second aircraft.

15. The method of claim 8, wherein the second rules of the second environment include initial conditions placing the first aircraft and the second aircraft at random positions and headings.

16. The method of claim 8, wherein the second rules of the second environment include initial conditions placing the first aircraft such that a first angle formed by a first heading of the first aircraft and the second aircraft is smaller than a second angle formed by a second heading of the second aircraft and the first aircraft.

17. The method of claim 8, wherein the second rules of the second environment include initial conditions placing the first aircraft such that a first angle formed by a first heading of the first aircraft and the second aircraft is equal to a second angle formed by a second heading of the second aircraft and the first aircraft.

18. The method of claim 1, further comprising using the agent to control a non-simulated aircraft.

19. A non-transitory computer readable medium storing instructions that, when executed by a computing device, cause the computing device to perform functions for training an agent to control an aircraft, wherein the agent is a machine learning algorithm operated to control the aircraft, the functions comprising:

selecting, by the agent, first actions for the aircraft to perform within a first environment respectively during first time intervals based on first states of the first environment during the first time intervals;

updating the agent based on first rewards that correspond respectively to the first states, wherein the first rewards are based on first rules of the first environment;

selecting, by the agent, second actions for the aircraft to perform within a second environment respectively during second time intervals based on second states of the second environment during the second time intervals; and updating the agent based on second rewards that correspond respectively to the second states, wherein the second rewards are based on second rules of the second environment, and wherein at least one first rule of the first rules is different from at least one rule of the second rules.

20. A computing device comprising:

one or more processors;

a computer readable medium storing instructions that, when executed by the one or more processors, cause the computing device to perform functions for training an agent to control an aircraft, wherein the agent is a machine learning algorithm operated to control the aircraft, the functions comprising:

selecting, by the agent, first actions for the aircraft to perform within a first environment respectively during first time intervals based on first states of the first environment during the first time intervals;

updating the agent based on first rewards that correspond respectively to the first states, wherein the first rewards are based on first rules of the first environment;

selecting, by the agent, second actions for the aircraft to perform within a second environment respectively during second time intervals based on second states of the second environment during the second time intervals; and updating the agent based on second rewards that correspond respectively to the second states, wherein the second rewards are based on second rules of the second environment, and wherein at least one first rule of the first rules is different from at least one rule of the second rules.

* * * * *